US009064189B2

United States Patent
Li et al.

(10) Patent No.: US 9,064,189 B2
(45) Date of Patent: Jun. 23, 2015

(54) PLAYFIELD DETECTION AND SHOT CLASSIFICATION IN SPORTS VIDEO

(71) Applicant: General Instrument Corporation, Horsham, PA (US)

(72) Inventors: Renxiang Li, Lake Zurich, IL (US); Kevin L Baum, Rolling Meadows, IL (US); Faisal Ishtiaq, Chicago, IL (US)

(73) Assignee: ARRIS Technology, Inc., Suwanee, GA (US)

( * ) Notice: Subject to any disclaimer, the term of this patent is extended or adjusted under 35 U.S.C. 154(b) by 96 days.

(21) Appl. No.: 13/841,969

(22) Filed: Mar. 15, 2013

(65) Prior Publication Data

US 2014/0270500 A1 Sep. 18, 2014

(51) Int. Cl.
G06K 9/00 (2006.01)
G06K 9/46 (2006.01)
G06K 9/62 (2006.01)

(52) U.S. Cl.
CPC .......... *G06K 9/6267* (2013.01); *G06K 9/00724* (2013.01)

(58) Field of Classification Search
None
See application file for complete search history.

(56) References Cited

U.S. PATENT DOCUMENTS

| 8,326,042 | B2 | 12/2012 | Wu et al. |
| 2003/0063798 | A1 | 4/2003 | Li et al. |
| 2004/0130567 | A1 | 7/2004 | Ekin et al. |
| 2007/0242088 | A1* | 10/2007 | Kim et al. ..................... 345/660 |
| 2008/0118153 | A1* | 5/2008 | Wu et al. ....................... 382/190 |
| 2008/0310727 | A1* | 12/2008 | Wu et al. ....................... 382/190 |

OTHER PUBLICATIONS

Ekin, Ahmet, and A. Murat Tekalp. "Framework for tracking and analysis of soccer video." Electronic Imaging 2002. International Society for Optics and Photonics, 2002.*
PCT Search Report & Written Opinion, RE: Application #PCT/US2014/022152; dated Sep. 22, 2014.
A. Ekin, et al., "Shot Type Classification by Dominant Color for Sports Video Segmentation and Summarization", IEEE Proceedings of International conference on Acoustics Speech and Signal Processing (ICASSP '03), vol. 3, Apr. 6, 2003.
X. Peng, et al., "Algorithms and System for Segmentation and Structure Analysis in Soccer Video", Multimedia and Expo, IEEE International Conference on, Advanced Distributed Learning, Aug. 22, 2001, pp. 721-724.
W. Zhou, et al., "Rule-based Video Classification System for Basketball Video Indexing", Proceedings ACM Multimedia 2000 Workshops, Nov. 4, 2000, pp. 213-216.
S.C. Pei, et al., "Semantic Scenes Detection and Classification in Sports Videos", 16th IPPR Conference on computer Vision, Graphics and Image Processing (CVGIP 2003), Aug. 17, 2003, pp. 210-217.

(Continued)

*Primary Examiner* — Li Liu
(74) *Attorney, Agent, or Firm* — Thomas A. Ward

(57) ABSTRACT

A method of classifying the shot type of a video frame, comprising loading a frame, dividing the frame into field pixels and non-field pixels based on a first playfield detection criteria, determining an initial shot type classification using the number of the field pixels and the number of the non-field pixels, partitioning the frame into one or more regions based on the initial classification, determining the status of each of the one or more regions based upon the number of the field pixels and the non-field pixels located within each the region, and determining a shot type classification for the frame based upon the status of each the region.

13 Claims, 22 Drawing Sheets

(56) References Cited

OTHER PUBLICATIONS

Anonymous, "Otsu's method—Wikipedia, the free encyclopedia", Feb. 28, 2013, retrieved from URL <http://en.wikipedia.org.w/index.php?title=0tsu%27s_method&oldid=541198190>, retrieved on Jun. 25, 2014.

Anonymous, "Point Operations—Logical OR/NOR", Dec. 19, 2012, retrieved from URL <https://web.archive.org/web/20121219105946/http://homepages.inf.ed.ac.uk/rbf/HIPR2/or.htm> on Jun. 25, 2014.

Anonymous, "How to find RGB/HSV color parameters for color tracking?", Stack Overflow, Apr. 16, 2010, retrieved from URL <https://web.archive.org/web/20100416173748/http://stackoverflow.com/questions/1518761/how-to-find-rgb-hsv-color-parameters-for-color-tracking? on Jun. 30, 2014.

A. Ekin, et al., "Automatic Soccer Video Analysis and Summarization", IEEE Transactions on Image Processing, vol. 12, No. 7, Jul. 7, 2003, pp. 796-807.

P. Xu, et al., "Algorithms and System for Segmentation and Structure Analysis in Soccer Video", IEEE International Conference on Multimedia and Expo, 2001 ICME 2001, Aug. 22-25, 2001, pp. 721-724.

Y. Liu, et al., "Playfield Detection Using Adaptive GMM and Its Application", IEEE International Conference on Acoustics, Speech, and Signal Processing, 2005 Proceedings (ICASSP '05), Mar. 18-23, 2005, pp. 421-424.

L. Wang, et al., "Automatic Extraction of Semantic Colors in Sports Video", IEEE International Conference on Aucoustics, Speech, and Signal Processing, 2004 (ICASSP '04), May 17-21, 2004, pp. 617-620.

S. Jiang, et al., "A New Method to Segment Playfield and its Applications in Match Analysis in Sports Video", Multimedia '04 Proceedings of the 12th annual ACM international conference on Multimedia, Oct. 10-16, 2004, pp. 292-295.

L-Y. Duan, et al., "A Unified Framework for Semantics Shot Classification in Sports Video", IEEE Trans. on Multimedia, Dec. 2005, 2 pgs.

Y. Liu, "A New Method for Shot Identification in Basketball Video", Journal of Software vol. 6, No. 8, Aug. 2011, pp. 1468-1475.

* cited by examiner

Local Hue Histogram

Local Saturation Histogram

Local Value Histogram

Accumulated Hue Histogram

Accumulated Saturation Histogram

Accumulated Value Histogram ns a single frame of video without needing training time based on playfield detection criteria such as HSV color ranges, and can adapt the playfield detection criteria over time as additional frames are reviewed.

PLAYFIELD DETECTION AND SHOT CLASSIFICATION IN SPORTS VIDEO

BACKGROUND

1. Technical Field

The present disclosure relates to the field of digital video analysis and encoding, particularly a method of detecting playfields and classifying shots in sports video.

2. Background

Watching sports video is a popular pastime for many people. Digital transmissions of sports video can be viewed on televisions directly or through set-top boxes, or on other devices such as personal computers, tablet computers, smartphones, mobile devices, gaming consoles, and/or other equipment. Digital recordings of sports video can be viewed on the same devices and viewing the digital recordings can begin at the start of a recorded event or midway through the event.

Automatic parsing of sports video based on visual and/or cinematographic cues can be used to identify segments of potential interest to a viewer, and/or points at which video on demand playback can begin. Visual cues, such as long shots, medium shots and close up shots, can be used to identify segments of the video where on-field events are occurring, or to distinguish on-field events from close up views of players, referees, balls, logos, or other items. Long shots frequently provide coverage of large areas of a playing surface, such as a playing field or court, and frequently identify periods of time during which activity on the field is at a maximum. Extended periods of play can comprise a sequence of long shots followed by medium and/or close up shots which signify the end of a play or highlight the contributions of key players. Detection of long shots can also aid in automatically identifying highlights from the video, and/or automatically summarizing video.

Some methods of classifying shots have been developed. For example, some existing methods learn and adjust to color variations of the playfield, but do not detect shot types based on color histograms of selected regions of frames or accumulate the histograms by determined shot types. In other existing methods, color histograms are accumulated over a random selection of frames, not a selection of frames determined by the shot type. Still other methods use a Gaussian mixture model to classify shots, but requires training time to determine peaks of histograms before shot classification can begin, which can be difficult if non-sports video is interspersed with the sports video, such as commercials or pregame analysis.

SUMMARY

What is needed is a method of shot identification that can classify the shot type of a single frame of video without needing training time based on playfield detection criteria such as HSV color ranges, and can adapt the playfield detection criteria over time as additional frames are reviewed.

In one embodiment, a method of classifying the shot type of a video frame is provided, the method comprising loading a frame, dividing the frame into field pixels and non-field pixels based on a first playfield detection criteria, determining an initial shot type classification using the number of the field pixels and the number of the non-field pixels, partitioning the frame into one or more regions based on the initial classification, determining the status of each of the one or more regions based upon the number of the field pixels and the non-field pixels located within each the region, and determining a shot type classification for the frame based upon the status of each the region.

BRIEF DESCRIPTION OF THE DRAWINGS

Further details of the present invention are explained with the help of the attached drawings in which.

DETAILED DESCRIPTION

Figure 1:
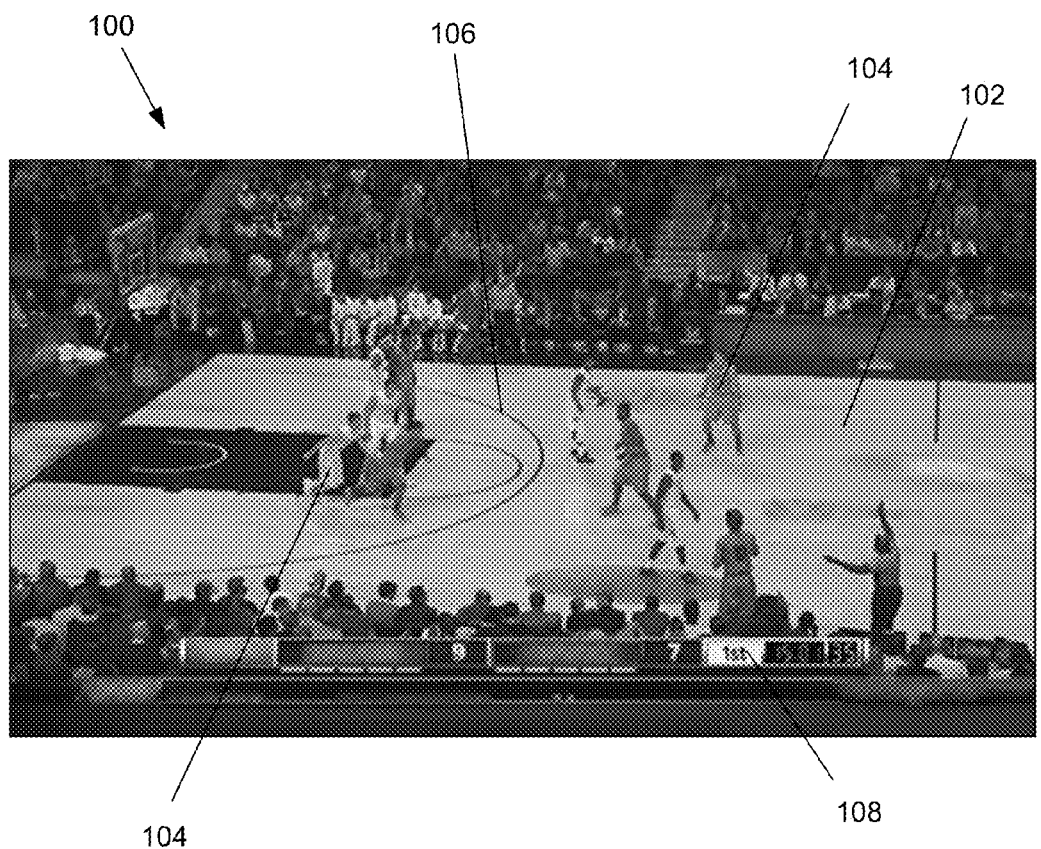
FIG. 1 depicts an exemplary embodiment of a video frame.

FIG. 1 depicts an exemplary frame 100 of a long shot in sports video. A video frame 100 can comprise a plurality of pixels. By way of a non-limiting example, in some 1080p high definition videos, each frame 100 can comprise 1920 pixels by 1080 pixels. Long shots can be shots of one or more subjects that are taken at a distance and/or have a wide field of view. In sports video, long shots generally show a portion of a playfield 102, as shown in FIG. 1. In some sports, the playfield 102 can be a court, such as in basketball or tennis. In other sports, the playfield 102 can be a field, such as in football, baseball, and soccer. In still other sports, the playfield 102 can be an ice rink, such as in ice hockey, or other type of playfield. Playfields 102 can be made of grass, turf, wood, ice, cement, clay, sand, any other type of surface. Regardless of the specific sport, most playfields 102 have large areas of uniform or near uniform color. By way of non-limiting examples, in football most fields are made of grass or turf that is predominantly green, while in basketball many courts are made of hardwood that predominantly has natural tan coloring. When long shots and medium shots can be identified in sports video, this information can be used to influence the operations of video processing equipment that includes video encoders and/or transcoders. For example, in some embodiments a video encoder can modify its operating parameters such as quantization step size, coding unit size, transform unit size and macro-block modes based on the presence of a long shot being signaled. The uniform or near uniform color of playfields 102 can enable identification of long shots and/or medium shots in video frames, such that the video frames 100 can be encoded with bits allocated such that visually important parts of the frame 100, for instance the playfield 102 and players, are encoded at higher qualities using the available bit budget.

As can be seen from FIG. 1, in some shots the playfield 102 can be at least partially obscured by offensive and/or defensive players 104, referees, balls, lines 106, logos, on-screen displays 108, or other items. In some shots other elements or backgrounds can be visible, such as fans, stands, sidelines, portions of a stadium, or other items. Even though other items can be visible in the frame 100, in most long and/or medium shots the uniform or near uniform color of the playfield 102 can still fill a significant portion of the frame 100, as shown in FIG. 1.

Figure 2:
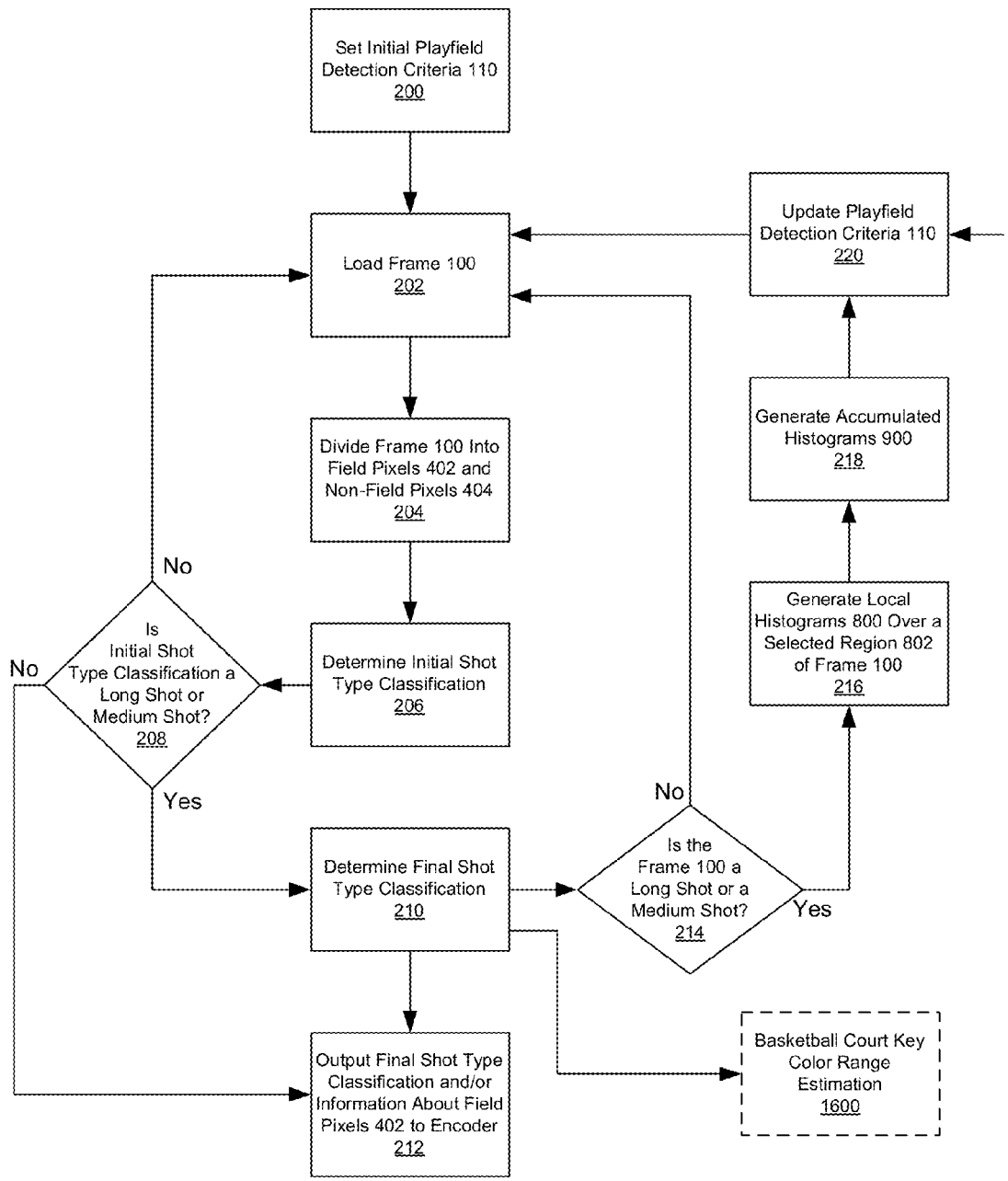
FIG. 2 depicts an exemplary embodiment of a method for determining that a video frame depicts a playfield and for classifying the frame as a long shot and/or medium shot.

FIG. 2 depicts a method for determining that a video frame 100 depicts a playfield 102 and for classifying the frame 100 as a long shot and/or medium shot. At step 200, a system can instantiate playfield detection criteria 110 in memory, and set the playfield detection criteria 110 to predetermined initial playfield detection criteria 110. The system can be a video processor, encoder, server, computer, or any other piece of equipment that can receive and analyze video frames 100. By way of a non-limiting example, the system can be an embedded system comprising one or more processors and one or more digital signal processors.

In some embodiments, the playfield detection criteria 110 can be color ranges defined in color models such as RGB, HSV, or any other desired color model. RGB models can describe the color of a pixel using the pixel's level of red, green, and blue. HSV models break down the color of a pixel into separate hue (H), saturation (S), and value (V) components. The hue component can describe the pixel's hue or tint. The saturation component can describe the pixel's saturation or amount of gray. The value component can describe the pixel's brightness or color intensity.

In some embodiments the system can set the initial playfield detection criteria 110 to be one or more color ranges that describe colors that are expected to appear within the playfield 102 of the particular sporting event and/or venue being shown in the video. By way of a non-limiting example, if the video is expected to depict a basketball game being played on a hardwood court playfield 102 that has natural tan coloring, the system at step 200 can set the initial playfield detection criteria 110 to a predetermined color range describing the colors generally expected to appear in hardwood basketball courts having natural tan coloring. By way of another non-limiting example, the initial playfield detection criteria 110 can also include color ranges generally expected to appear in lights that are reflected in a basketball court, such as a range of purple colors that have a high concentration of value components.

Figure 3A:
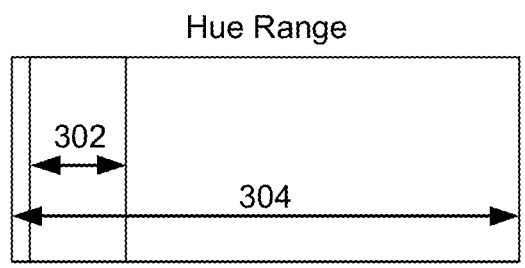
FIG. 3A depicts an exemplary embodiment of an initial hue range.
Figure 3B:
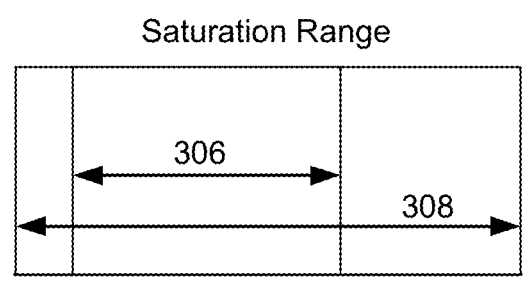
FIG. 3B depicts an exemplary embodiment of an initial saturation range.
Figure 3C:
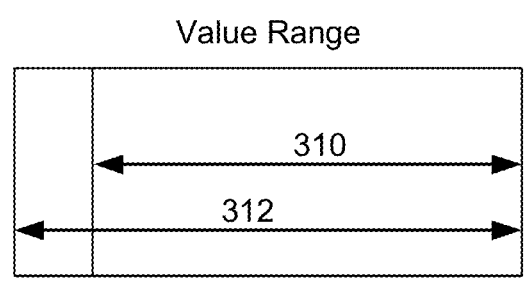
FIG. 3C depicts an exemplary embodiment of an initial value range.

In some embodiments, the system can set the initial playfield detection criteria 110 to initial HSV ranges of the colors that are expected to appear within the playfield 102 of the particular sporting event and/or venue being shown in the video. By way of a non-limiting example, FIGS. 3A-3C depict an example of predetermined initial HSV ranges for naturally colored hardwood basketball courts, with FIG. 3A depicting an initial hue range 302 out of the possible hue component values 304, FIG. 3B depicting an initial saturation range 306 out of the possible saturation component values 308, and FIG. 3C depicting an initial value range 310 out of the possible value component values 312. As can be seen from FIGS. 3A-3C in some embodiments the hue range 302 can be narrower than the saturation range 306 and value range 310 because playfield pixels can generally have more variation in saturation and value than in hue.

As will be discussed below, in some embodiments the initial playfield detection criteria 110 can be updated and/or refined as additional frames 100 are considered by the system during the video, such that the playfield detection criteria 110 are adapted over time to the colors of the specific playfield 102 of the particular sporting event and/or venue being shown in the video. By way of a non-limiting example, during analysis of a video the system can narrow one or more of the initial HSV ranges 302, 306, or 310 to fit the colors determined to be in the playfield 102 over time as additional frames 100 are considered.

Returning to FIG. 2, at step 202 the system can receive and/or load a video frame 100 comprising a plurality of pixels. The video frame 100 can be received and/or loaded from a source, such as a camera, media server, receiver, or any other piece of equipment. The frame 100 received and/or loaded at step 202 can be a frame 100 from any point in the video. By way of a non-limiting example, the system at step 202 can receive and/or load the first frame 100 of the video, proceed with other steps shown in FIG. 2 to determine whether a playfield 100 is depicted and/or classify the frame 100 as being a long shot or medium shot, and then return to step 202 to receive and/or load the next frame 100 of the video and repeat the process for the next frame 100.

At step 204, the system can divide the frame 100 into field pixels 402 and non-field pixels 404 based on the playfield detection criteria 110. Those pixels that meet the playfield detection criteria 110 can be classified as field pixels 402, and those pixels that do not meet the playfield detection criteria 110 can be classified as non-field pixels 404. By way of a non-limiting example, when the playfield detection criteria 110 includes a set of HSV ranges, the pixels of the frame 100 that have hue, saturation, and value components that are all within the hue range 302, the saturation range 306, and the value range 310 can be determined to be field pixels 402, while the pixels of the frame 100 that have at least one hue, saturation, or value component outside of the hue range 302, the saturation range 306, and the value range 310 can be determined to be non-field pixels 404.

Figure 4A:
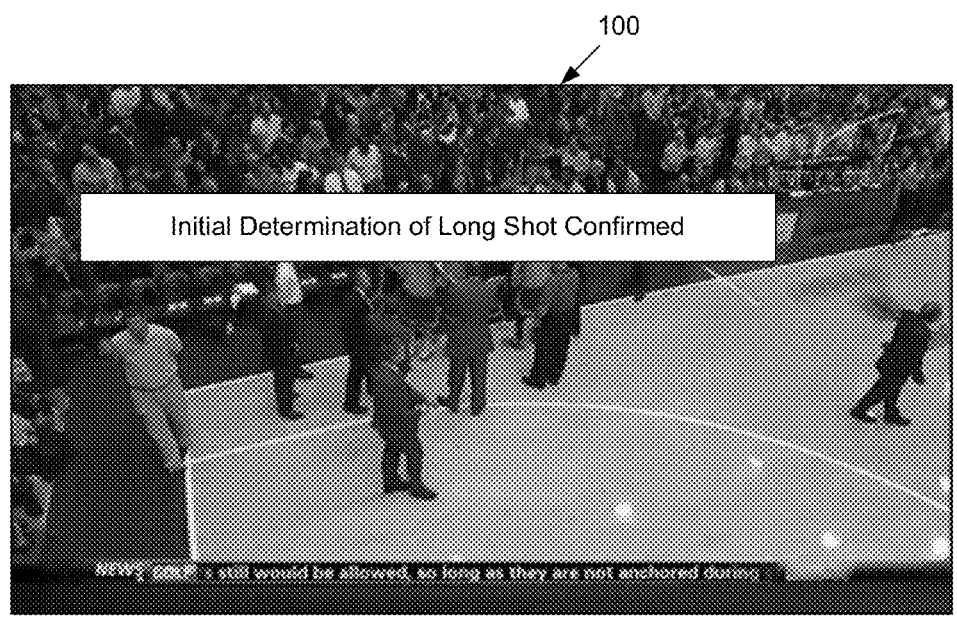
FIG. 4A depicts an exemplary embodiment of a frame depicting a long shot.
Figure 4B:
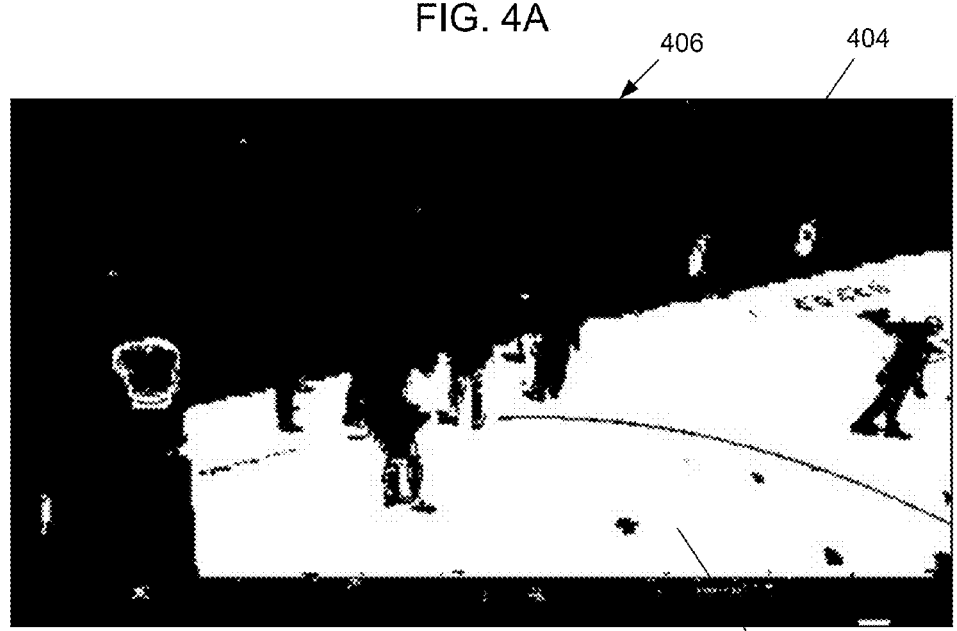
FIG. 4B depicts an exemplary binary mask generated from the frame of FIG. 4A.

In some embodiments, at step 204 the system can divide the frame 100 into field pixels 402 and non-field pixels 404 by generating a binary mask 406 of the frame 100. The binary mask 406 can comprise mask pixels representing the pixels classified as field pixels 402, and non-mask pixels representing the pixels classified as non-field pixels 404. By way of a non-limiting example, FIG. 4A depicts an exemplary frame 100, and FIG. 4B depicts an exemplary binary mask 406 comprising white mask pixels representing the field pixels 402 determined from FIG. 4A and black non-mask pixels representing the non-field pixels 404 determined from FIG. 4A.

In some embodiments, when the playfield detection criteria 110 contains more than one set of HSV color ranges, each set of HSV ranges can be considered separately to sort pixels into mask pixels and non-mask pixels to generate a binary mask 406 for each set of HSV ranges, and each binary mask 406 can be combined into a final combined binary mask 406. Further, in some embodiments, a set of HSV ranges can be applied to a region of the frame 100 rather than the whole frame 100 to generate a binary mask 406.

When two or more sets of HSV ranges are in the playfield detection criteria 110, the first set of HSV ranges can be considered a first playfield detection criteria 110a and the second set of HSV ranges can be considered a second playfield detection criteria 110b. The first set of HSV ranges can be different than the second set of HSV ranges, and therefore the first playfield detection criteria 110a is different from the second playfield detection criteria 110b. Field pixels 402 for a frame 100 can be obtained by applying the first playfield detection criteria 110a to a first region and the second playfield detection criteria 110b to a second region. The field pixels 402 for the second region of the frame 100 can be incorporated into the field pixels 402 obtained from the first playfield detection criteria 110a, such that the field pixels 402 for the second region of the frame 100 is incorporated into the field pixels 402 obtained from the first playfield detection criteria 110a using a logical combination of field pixels 402 from the first and second regions. The resulting final binary mask 406 can be the combination of binary masks 406 for each set of HSV ranges using logical AND, OR, and/or XOR operations. By way of a non-limiting example, in some embodiments the playfield detection criteria 110 can include a set of HSV color ranges for a basketball court and a second set of HSV color ranges for gloss surface reflections within the basketball court, such as reflections of lighting fixtures, billboards, and/or other elements within the venue. The mask pixels and non-mask pixels of the final combined binary mask 406 can be considered to be the field pixels 402 and non-field pixels 404, respectively.

Returning to FIG. 2, at step 206 the system can determine an initial classification of the shot type of the frame 100. The shot type can be a long shot, a medium shot, or a close-up shot. In some embodiments, the system can determine the initial shot type classification using the number of the field pixels 402 and the number of the non-field pixels 404. By way of a non-limiting example, in some embodiments the system can determine the initial shot type classification by calculating a total field pixel ratio of the entire frame 100 from the number of field pixels 402 and the number of the non-field pixels 404. The system can obtain the total field pixel ratio of the entire frame 100 by dividing the number of field pixels 402 by the total number of pixels in the frame 100. In some embodiments, the total field pixel ratio can be compared against one or more predetermined total threshold ratios for one or more shot types to obtain the initial classification of the shot type. By way of a non-limiting example, in some embodiments, the predetermined total threshold ratio for a long shot can be set at 20%, such that if the total field pixel ratio is at or above 20%, the frame 100 can be initially classified as a long shot at step 206.

At step 208, the system can determine if the frame 100 was initially determined to be a long shot or medium shot at step 206. If the frame 100 was determined to be a long or medium shot, the system can move to step 210. If the frame 100 was not determined to be a long or medium shot, the system can move to step 212 to inform the encoder that the frame 100 is not a long or medium shot, and/or to inform the encoder to encode the frame 100 normally without considering the frame 100 to be a long or medium shot. If the frame 100 was not determined to be a long or medium shot, the system can also return to step 202 to receive and/or load the next frame 100.

Figure 5A:
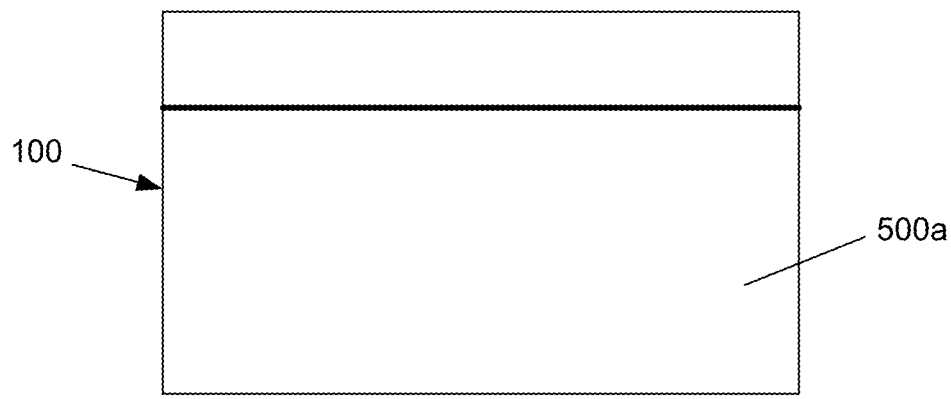
FIG. 5A depicts an exemplary embodiment of a detection region.
Figure 5B:
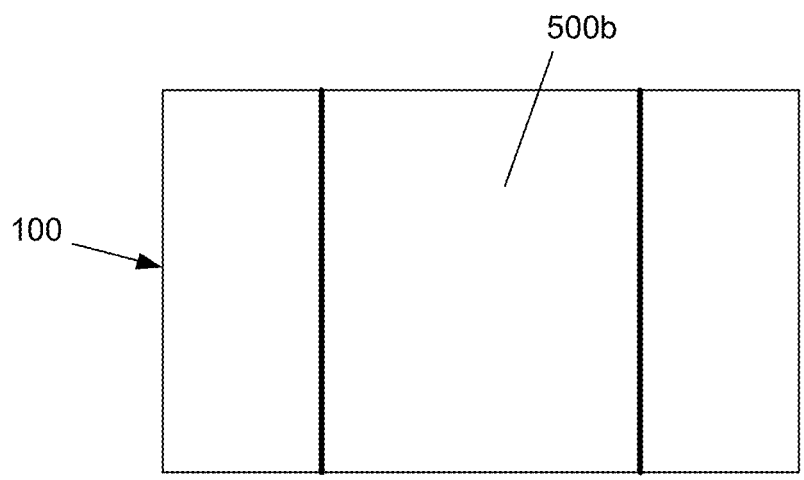
FIG. 5B depicts another exemplary embodiment of a detection region.

At step 210, the system can determine a final classification of the shot type of the frame. In some embodiments, the system can refine and/or verify the initial shot type classification determined during step 206 to obtain the final shot type classification. To determine the final shot type classification, the system can partition the frame 100 into one or more detection regions 500 based on said initial classification, and determine one or more regional field ratios of one or more the detection regions 500 of the frame 100. In some embodiments, the detection regions 500 can be geometrically constrained regions, such as rectangular regions, square regions, or any other geometric region. In alternate embodiments, the detection regions 500 can have curved edges, be oval, round, be polygonal, or have any other desired shape. By way of a non-limiting example, FIG. 5A depicts an embodiment in which the total frame 100 is divided vertically into two regions: the top quarter, and the bottom three quarters, in which the bottom three quarters can be a first detection region 500*a*. As another non-limiting example, FIG. 5B depicts an embodiment in which the total frame 100 is divided horizontally into three regions: the left quarter, the center half, and the right quarter, in which the center half can be a second detection region 500*b*.

The system can determine the status of each of one or more detection regions 500 based upon the number of field pixels 402 and non-field pixels 404 located within each detection region 50. In some embodiments, the regional field ratio of each detection region 500 can be obtained by dividing the number of field pixels 402 within the detection region 500 by the total number of pixels within the detection region 500. In alternate embodiments, the regional ratio of each detection region 500 can be obtained by dividing the number of field pixel 402 within one sub-region by the number of field pixel 402 within another sub-region. By way of a non-limiting example, in some embodiments, the regional field ratio can be determined by dividing the number of field pixels 402 within the top quarter of the frame 100 by the number of field pixels 402 within the bottom three quarters of the frame 100. The regional field ratio for each detection region 500 can be compared against one or more predetermined regional threshold ratios for one or more shot types to confirm or update the initial classification of the shot type and determine the final shot type classification at step 210. By way of a non-limiting example, in some embodiments the predetermined regional threshold ratio for the first detection region 500*a* shown in FIG. 5A for a long shot can be set at 65%, such that if the regional field pixel ratio is at or above 65% within the first detection region 500*a*, the final classification of shot type of the frame 100 can be determined to be a long shot at step 210.

In some embodiments, the system can determining the final shot type classification for the frame 100 based upon the status of each detection region 500. By way of a non-limiting example, in some embodiments the system can determine the final shot type classification by comparing the regional field ratios of more than one detection region 500 against each detection region's predetermined regional threshold ratio. In other embodiments, the system can determine the final shot type classification by comparing the regional field ratios of a single detection region 500 against that detection region's predetermined regional threshold ratio.

In alternate embodiments, if the total field pixel ratio determined during step 206 was above a histogram threshold percentage, a hue histogram of the frame 100 can be used to verify the initial shot type classification. By way of a non-limiting example, the histogram threshold percentage can be set at 50%. The frame's hue histogram can be partitioned into two regions: a first range within the hue range of the playfield detection criteria 110, and a second range outside of the hue range or the playfield detection criteria 110. In some embodiments, if the standard deviation of the second range is larger than the standard deviation of the first range, the frame 100 can be classified as a medium shot regardless of the regional field ratios. In alternate embodiments, a standard deviation ratio can be calculated by dividing the standard deviation of the second range by the standard deviation of the first range. The standard deviation ratio can be compared to a predetermined standard deviation ratio threshold to determine a shot type classification. For example, if the standard deviation ratio is larger than one, the frame 100 can be classified as a medium shot regardless of the regional field ratios.

FIGS. 4A-4B, 6A-6B, and FIGS. 7A-7B depict non-limiting examples of video frames 100 and binary masks that can be generated from the video frames 100 based on the playfield detection criteria 110.

FIG. 4A depicts a frame 100 that depicts a wide shot of a basketball game broadcast that shows the playing surface 102. The frame 100 of FIG. 4A can be determined to be a long shot through the steps of 202-210. FIG. 4B depicts a binary mask of field pixels 402 and non-field pixels 404 that can be generated at step 204 from the frame 100 shown in FIG. 4A. At step 206, the system can determine that the total field pixel ratio is high enough to initially qualify the frame 100 as a long shot. At step 210, the system can confirm the initial classification and determine the final shot type classification as a long shot by finding that the regional field pixel ratios in both the first detection region 500*a* of the bottom three quarters of the frame 100 and the second detection region 500*b* of the center half of the frame 100 are high enough to qualify the frame 100 as a long shot.

Figure 6A:
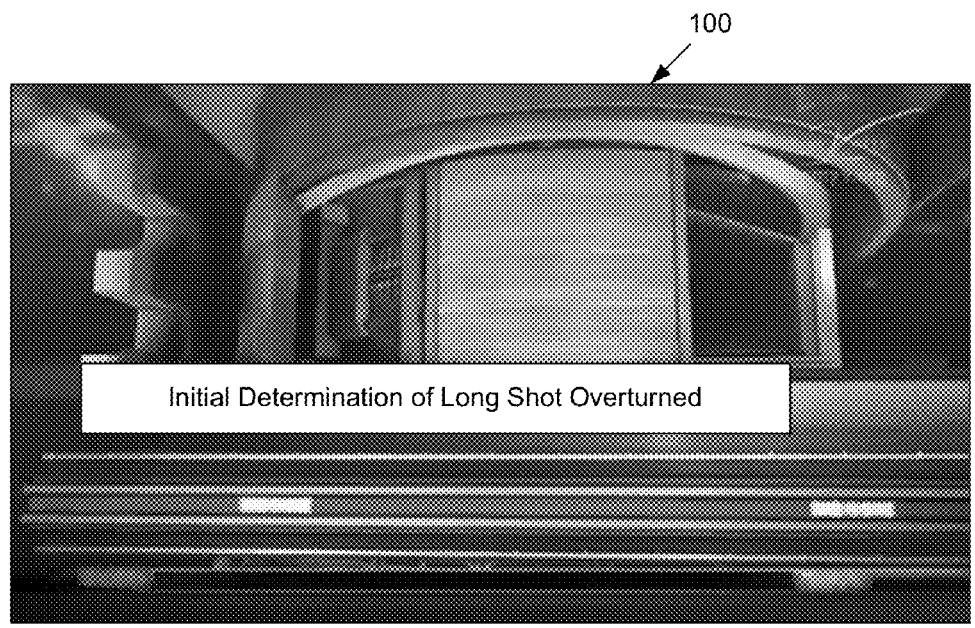
FIG. 6A depicts an exemplary embodiment of a frame not depicting a long shot.
Figure 6B:
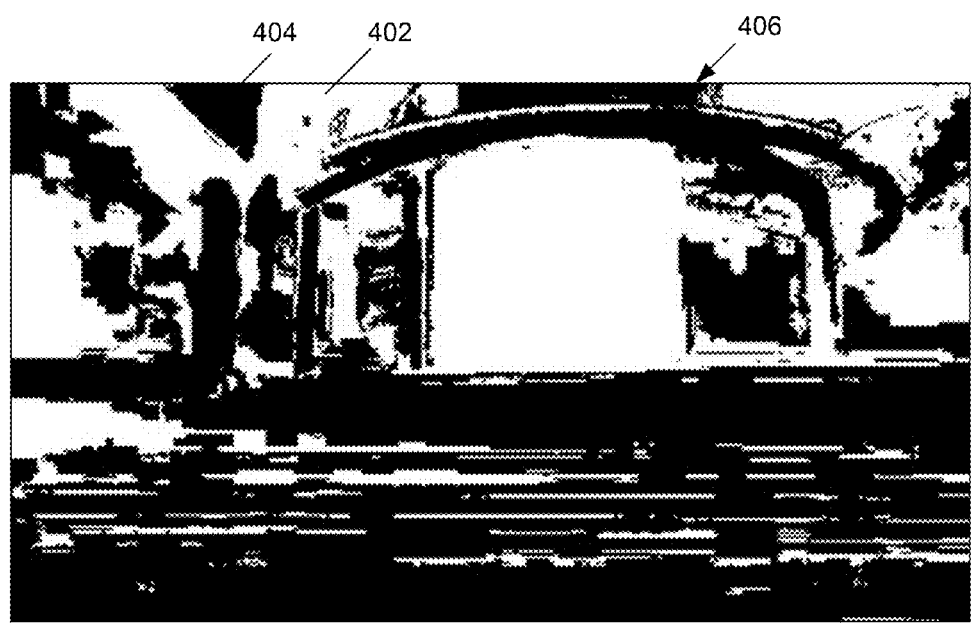
FIG. 6B depicts an exemplary binary mask generated from the frame of FIG. 6A.

FIG. 6A depicts a frame 100 that depicts on screen graphics during a basketball game broadcast, but does not show the playing surface 102. The frame 100 of FIG. 6A can be determined to not be a long shot through the steps of 202-210. FIG. 6B depicts a binary mask of field pixels 402 and non-field pixels 404 that can be generated at step 204 from the frame 100 shown in FIG. 6A. At step 206, the system can determine that the total field pixel ratio is high enough to initially qualify the frame 100 as a long shot. However, the system can find at step 210 that the initial classification of the frame 100 as a long shot was incorrect, because the regional field pixel ratios in the first detection region 500*a* of the bottom three quarters of the frame 100 was not high enough to qualify the frame 100 as a long shot. Alternatively, the system can find at step 210 that the initial classification of the frame 100 as a long shot was incorrect, because the field pixels 402 were more densely distributed in the top quarter of the frame 100 than in the bottom three quarters of the frame 100, such that the regional pixel ratio determined by dividing the number of field pixels 402 it the top quarter of the frame by the number of field pixels 402 in the bottom three quarters of the frame was higher than a predetermined regional threshold ratio.

Figure 7A:
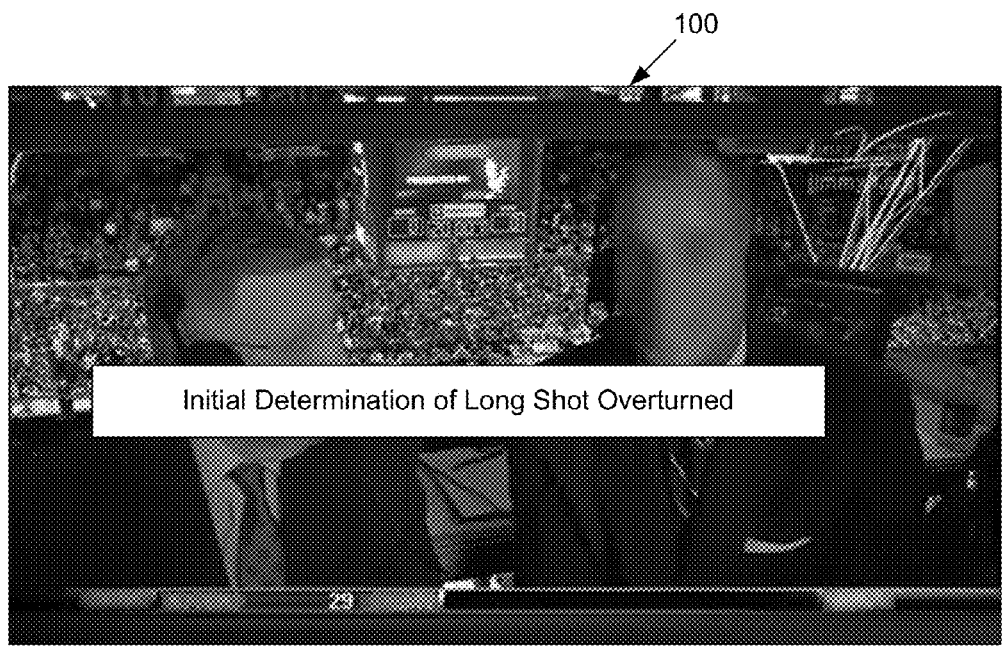
FIG. 7A depicts another exemplary embodiment of a frame not depicting a long shot.
Figure 7B:
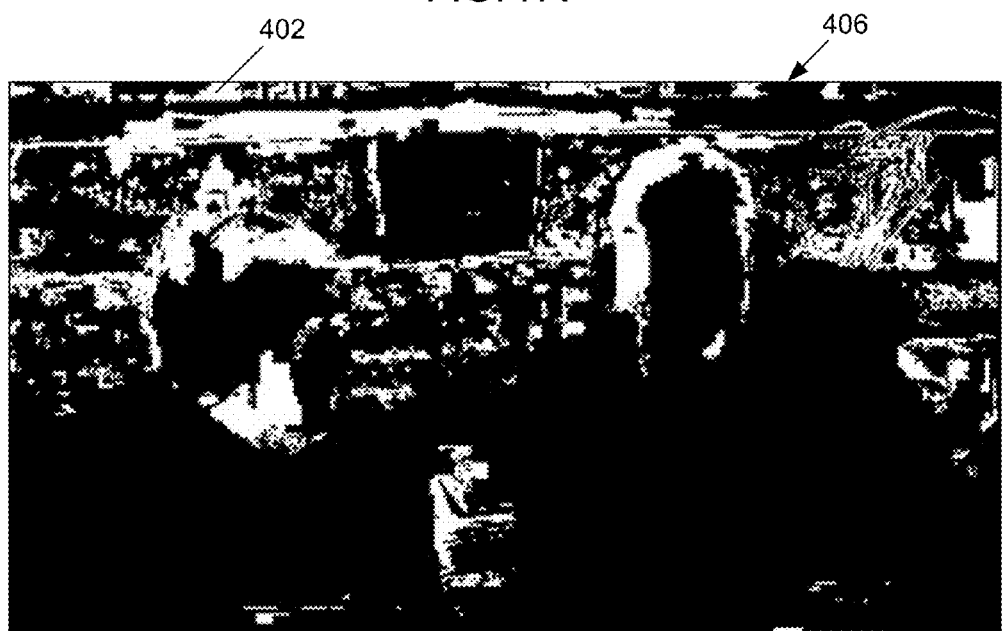
FIG. 7B depicts an exemplary binary mask generated from the frame of FIG. 7A.

Similarly, FIG. 7A depicts a frame 100 that depicts announcers during a basketball game broadcast, but does not show the playing surface 102. The frame 100 of FIG. 7A can be determined to not be a long shot through the steps of 202-210. FIG. 7B depicts a binary mask of field pixels 402 and non-field pixels 404 that can be generated at step 204 from the frame 100 shown in FIG. 7A. At step 206, the system can determine that the total field pixel ratio is high enough to initially qualify the frame 100 as a long shot. However, the system can find at step 210 that the initial classification of the frame 100 as a long shot was incorrect, because the regional field pixel ratios in the first detection region 500*a* of the bottom three quarters of the frame 100 was not high enough to qualify the frame 100 as a long shot. Alternatively, the system can find at step 210 that the initial classification of the frame 100 as a long shot was incorrect, because the field pixels 402 were more densely distributed in the top quarter of the frame 100 than in the bottom three quarters of the frame 100, such that the regional pixel ratio determined by dividing the number of field pixels 402 in the top quarter of the frame by the number of field pixels 402 in the bottom three quarters of the frame was higher than a predetermined regional threshold ratio.

Returning to FIG. 2, at step 212 the system can inform an encoder of the shot type of the frame 100. If the final shot type classification of the frame 100 was a long shot or medium shot, the system can inform the encoder that the frame 100 is a long shot or medium shot. If the initial and/or final shot type classification of the frame 100 was not a long shot or medium shot, the system can inform the encoder that the frame 100 is not a long or medium shot, and/or inform the encoder to encode the frame 100 normally without considering the frame 100 to be a long or medium shot. In some embodiments, the encoder can use the final shot type classification to encode the frame 100. In some embodiments, the system can additionally inform the encoder about which pixels of the frame 100 were classified as field pixels 402 and/or non-field pixels 404. By way of a non-limiting example, the system can transmit the frame's binary mask 406 to the encoder.

At step 214, the system can determine whether the final shot type classification determined at step 210 was a long shot or medium shot. If the final shot type classification was not a long shot or medium shot, the system can return to step 202 to receive and/or load the next frame 100. However, if the final shot type classification was a long shot or medium shot, the system can move to steps 216-220 to update the playfield detection criteria 110 stored in memory based on the color characteristics of the frame 100.

Figure 8A:
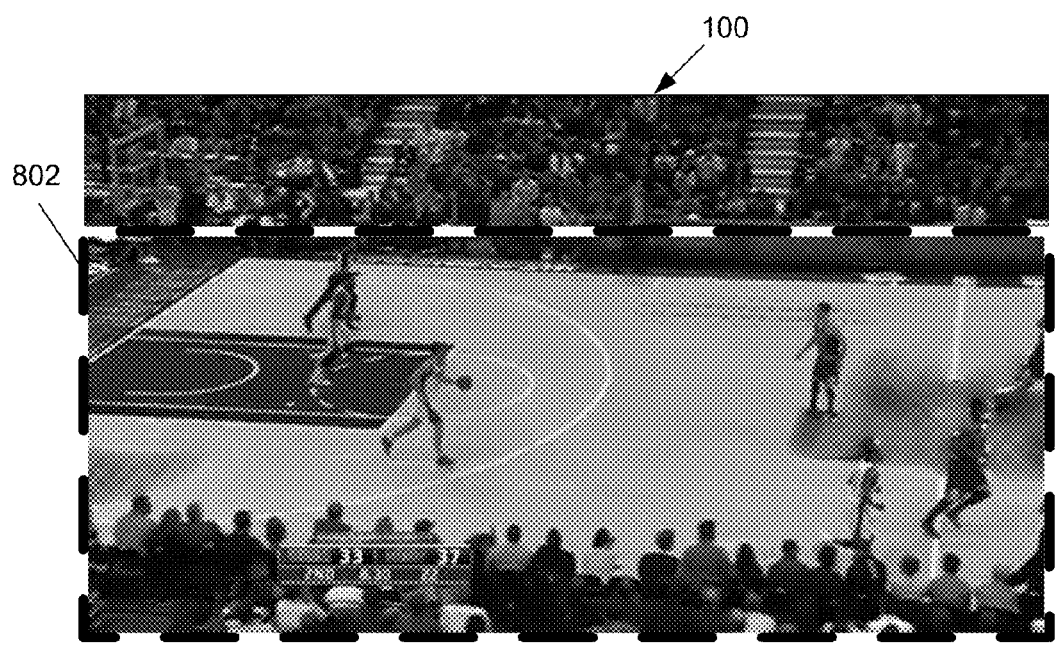
FIG. 8A depicts another exemplary embodiment of a frame depicting a long shot.

At step 216 the system can generate one or more local histograms 800 of the colors of one or more selected regions 802 of the frame 100. The selected regions 802 can be predetermined areas of the frame 100 likely to show at least a portion of the playfield 102. In some embodiments, the selected regions 802 can be determined based at least in part on the final classification of the shot type and/or the sport being shown in the video. By way of a non-limiting example, for frames 100 of a basketball game video that were determined to be long shots, as shown in FIG. 8A the selected region 802 can be the lowest three quarters of the frame 100 because in basketball video the upper quarter of the frames 100 are likely to be non-court area. In alternate embodiments, the selected region 802 can be the same as one of the detection regions 500 used in step 210.

Figure 8B:
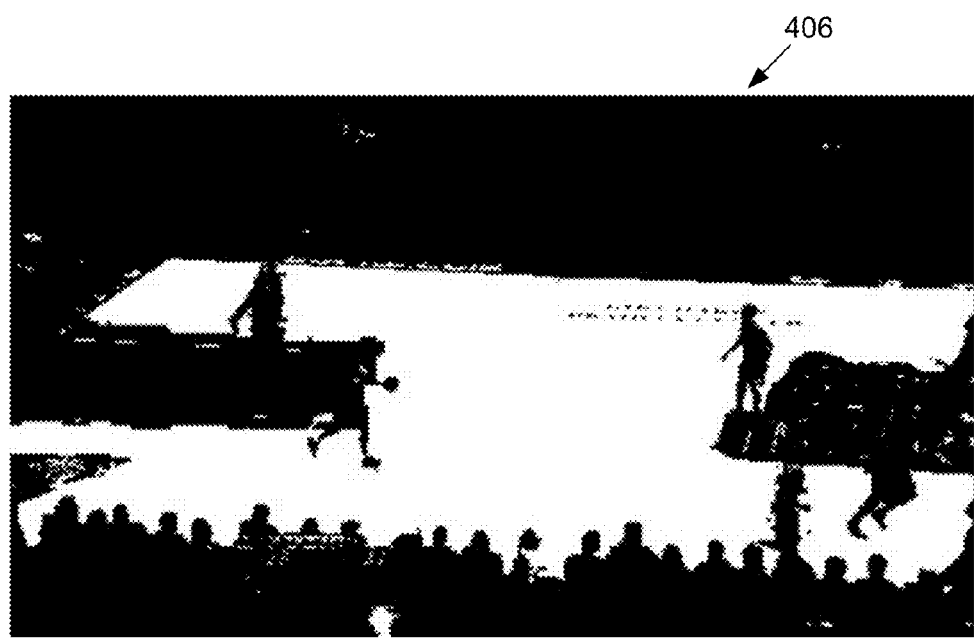
FIG. 8B depicts an exemplary binary mask generated from the frame of FIG. 8A.
Figure 8C:
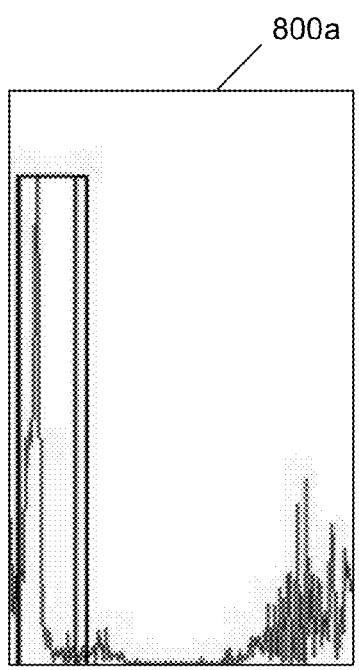
FIG. 8C depicts an exemplary local hue histogram generated from a selected region of the frame of FIG. 8A.
Figure 8D:
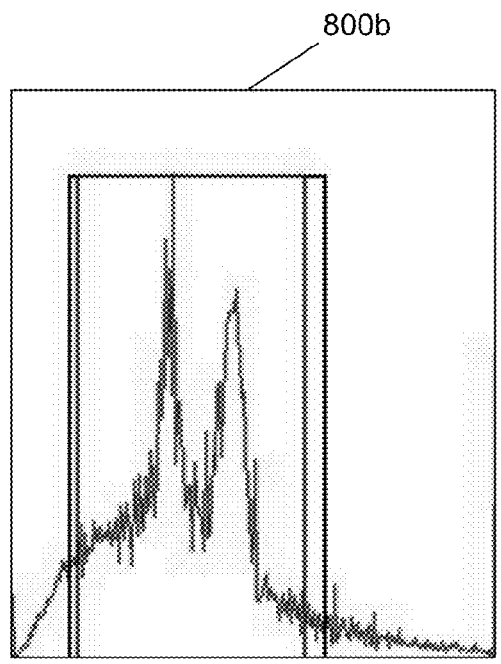
FIG. 8D depicts an exemplary local saturation histogram generated from a selected region of the frame of FIG. 8A.
Figure 8E:
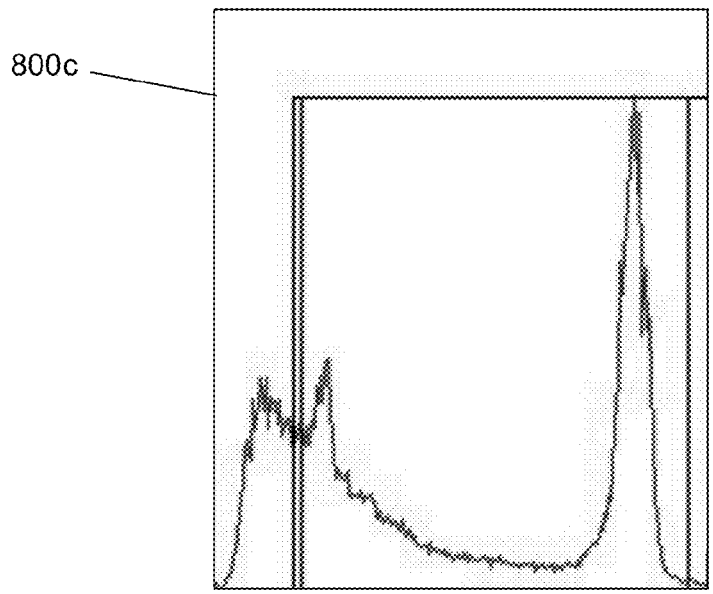
FIG. 8E depicts an exemplary local value histogram generated from a selected region of the frame of FIG. 8A.

In embodiments in which the playfield detection criteria 110 are HSV ranges, local histograms 800 of each of the hue, saturation, and value components of each of the pixels in the selected region 802 can be generated. By way of a non-limiting example, FIG. 8A depicts a video frame 100, and FIG. 8B depicts a binary mask 406 that can be used to determine that the frame shown in FIG. 8A is a long shot. FIGS. 8C-8E respectively depict a local hue histogram 800a, a local saturation histogram 800b, and a local value histogram 800c of the pixels within a selected region 802 within the frame 100 shown in FIG. 8A.

At step 218, the local histograms 800 generated during step 214 for a single frame 100 of a particular shot type can be integrated into accumulated histograms 900 for the shot type. By way of a non-limiting example, a local histogram 800 of a frame 100 determined to be a long shot can be integrated into an accumulated histogram 900 of all frames 100 determined to be long shots. If no previous frames 100 for the shot type have been analyzed, the local histograms 800 of the first frame 100 of the shot type can be used as the accumulated histogram 900 for that shot type. By way of a non-limiting example, in alternate embodiments, if no previous frames 100 for the shot type have been analyzed, uniform distribution within the color range of the play field detection criteria 110 can be used as the accumulated histogram 900.

At step 220, the system can update the playfield detection criteria 110 in memory based on the accumulated histograms 900 for each shot type. One or more peaks 904 of the accumulated histograms 900 can be determined, and the playfield detection criteria 110 can be fit to the peaks 904. In some embodiments, the system can perform low-pass filtering on the values of the accumulated histogram 900 prior to finding peaks 904. By way of a non-limiting example, in equation form, Hnew(i)=0.25H(i−1)+0.5H(i)+0.25H(i+1), where H is the accumulated histogram 900 and Hnew is the filtered accumulated histogram 900. By way of a non-limiting example, if the playfield detection criteria 110 includes HSV color ranges that are too broad for the peaks 904 of the accumulated local histogram 900, the HSV color ranges can be narrowed to fit the peaks 904, and be and saved as updated playfield detection criteria 110. The updated playfield detection criteria 110 can be saved to memory, and be used by the system at step 204 when the next frame 100 is analyzed and divided into field pixels 402 and non-field pixels 404.

Figure 9A:
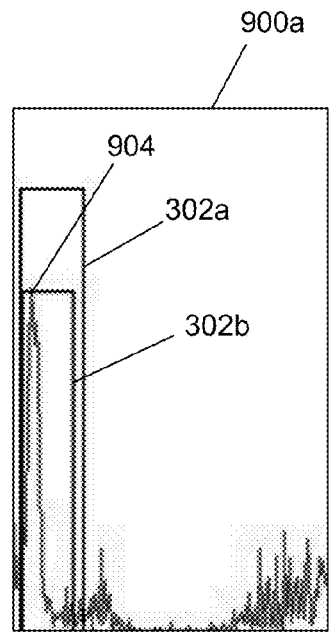
FIG. 9A depicts an exemplary accumulated hue histogram.
Figure 9B:
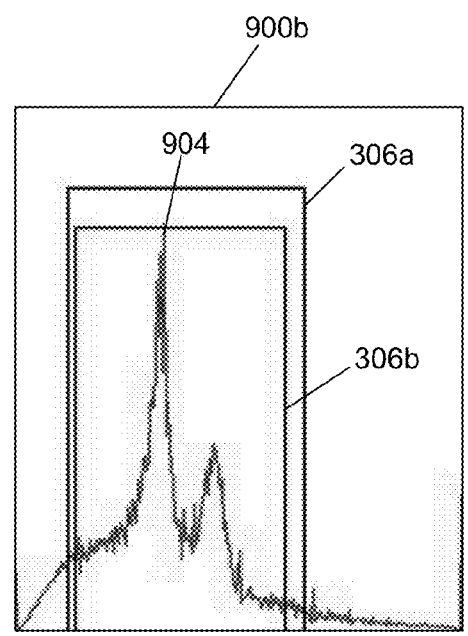
FIG. 9B depicts an exemplary accumulated saturation histogram.
Figure 9C:
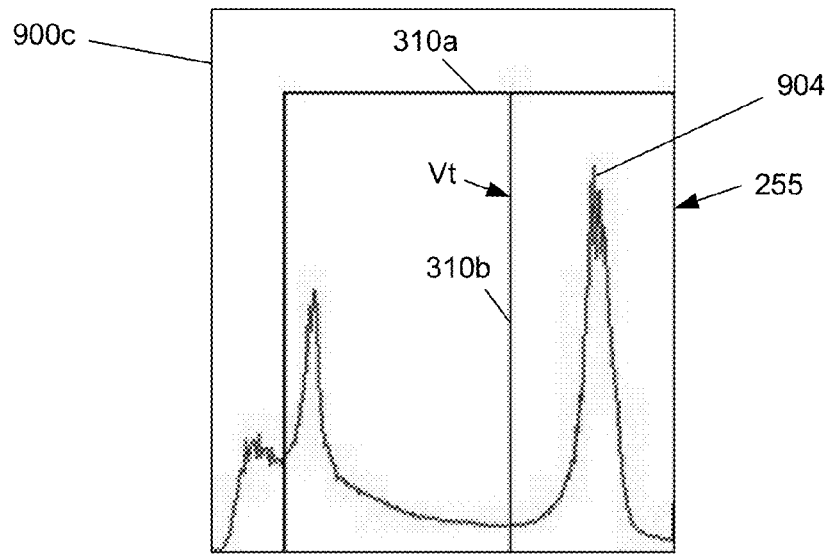
FIG. 9C depicts an exemplary accumulated value histogram.

By way of a non-limiting example, FIGS. 9A-9C respectively depict an accumulated hue histogram 900a, an accumulated saturation histogram 900b, and an accumulated value histogram 800c for long shots that incorporates data from the local histograms 800 shown in FIGS. 8C-8E. FIG. 9A depicts an accumulated histogram 900a of the hue components of pixels in the selected area 802, FIG. 9B depicts an accumulated histogram 900b of the saturation components of pixels in the selected area 802, and FIG. 9C depicts an accumulated histogram 900c of the value components of pixels in the selected area 802. As can be seen from FIG. 9A, the initial hue range 302a was too wide for the peak 904 of the accumulated histogram 900a, so the hue range can be narrowed to the updated hue range 302b. Similarly, as can be seen from FIGS. 9B and 9C, the initial saturation range 306a and the initial value range 310a was too wide for the peaks 904 of the accumulated histograms 900b and 900c, so the saturation and/or value ranges can be narrowed to the updated saturation range 306b and/or the updated value range 310b. The updated hue range 302b, the updated saturation range 306b, and the updated value range 310b can be used as the updated playfield detection criteria 110. As discussed above, in some embodiments the pixels depicting a playfield 102 generally have more variation in saturation and/or value than in hue, so the updated hue range 302b can be narrower than the updated saturation range 306b and/or the updated value range 310b. In some embodiments, the updated hue range 302b can provide cleaner playfield segmentation when the binary mask 404 is generated in step 204.

In some embodiments, dominant peaks can be found in the accumulated histograms 900 within the HSV ranges, and the dominant peaks can be used to narrow the HSV ranges, for example from the initial playfield detection criteria 110. In alternate embodiments, the total distribution of the accumulated histograms 900 within the playfield detection criteria 110 color ranges can be obtained and used to narrow the color ranges. By way of a non-limiting example, for the accumulated hue histogram 900a shown in FIG. 9A, the total distribution (S) within the initial hue range 302a can be obtained by summing the histogram values (H) between the low end (H_lo) of the hue range 302a and the high end (H_hi) of the hue range 302a. In equation form, the total distribution S=sum(H[H_lo:H_hi]). The initial hue range 302a can be updated to the updated hue range 302b, such that the updated hue range 302b spans between a new low end (new_H_lo) and a new high end (new_H_hi) in which the sum of the histogram values between the new low end and the new high end is less than (S*T), where T is a predetermined threshold. In some embodiments, the predetermined threshold (T) can be a value less than 1.0. In equation form, the initial hue range 302a can be narrowed to an updated hue range 302b in which |sum(H[new_H_lo:new_H_hi])−S*T|<epsilon, where T<1.0 and epsilon is a small positive float number, such as 0.01. By way of a non-limiting example, the predetermined threshold (T) can be 0.95, such that after narrowing the range down to the updated hue range 302b, 95% of the accumulated distribution within the initial hue range 302a is preserved. Playfield detection criteria 110 can be updated at step 220 to the new updated hue range 302b between the new low end (new_H_lo) and the new high end (new_H_hi).

In some embodiments, when the video frame 100 depicts a basketball game, the main peak of the accumulated value (V) histogram 900c can be identified at the bright end with the value range 310 extending between a first boundary (Vt) and the largest value (255). In these embodiments, the updated value range 310b can be determined by changing the first boundary of the initial value range 310a to an updated first boundary (Vt) in the updated value range 310b, while keeping the second boundary fixed at the largest value (255), such that the value range 310 is narrowed only from one end. In some embodiments, the updated first boundary (Vt) can be found by using Otsu's threshold method on the accumulated value histogram 900c to identify a first threshold value (v1). Otsu's threshold method can be used again on the accumulated value histogram 900c within the range extending from the first threshold value (v1) and the largest value (255) to find a second threshold value (v2). The second threshold value (v2) can be used as the updated first boundary (Vt) for the updated value range 310b, such that the range between the updated first boundary (Vt) and the largest value (255) is tight around the largest peak 904 in the accumulated value histogram 900c at the bright end.

In alternate embodiments, the updated first boundary (Vt) for the updated value range 310b of the accumulated value histogram 900c can be found within a range extending between a low value (S1) and a high value (S2), in which the low value and high value are obtained by the following equations: sum(V[0:S1])>=T1 and sum(V[0:S1−1])<T1, and sum(V[0:S2])>=T2 and sum(V[0:52−1])<T2. In some embodiments, T1 can be 0.3 and T2 can be 0.6. The updated first boundary (Vt) can be the minimum point between the low value (S1) and the high value (S2) of the accumulated value histogram 900c. The initial value range 310a in the playfield detection criteria 110 can be updated to an updated value range 310b between the first boundary (Vt) and the highest possible value (255).

Figure 10:
FIG. 10 depicts an exemplary frame determined to be a long shot.
Figure 11:
FIG. 11 depicts another exemplary frame determined to be a long shot.
Figure 12:
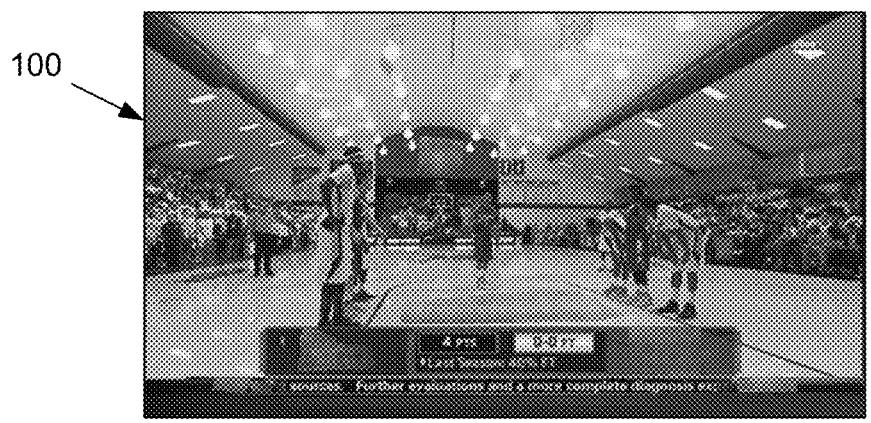
FIG. 12 depicts another exemplary frame determined to be a long shot.

FIGS. 10-12 depict further exemplary embodiments of frames 100 that can be determined to be long shots using the steps of FIG. 2. These exemplary frames 100 can each have enough pixels determined to be field pixels 402 based on initial or updated playfield detection criteria 110 to initially qualify as a long shot, and can also have enough field pixels 402 in the detection regions 500 to have the system's final shot type classification be a long shot.

Figure 13:
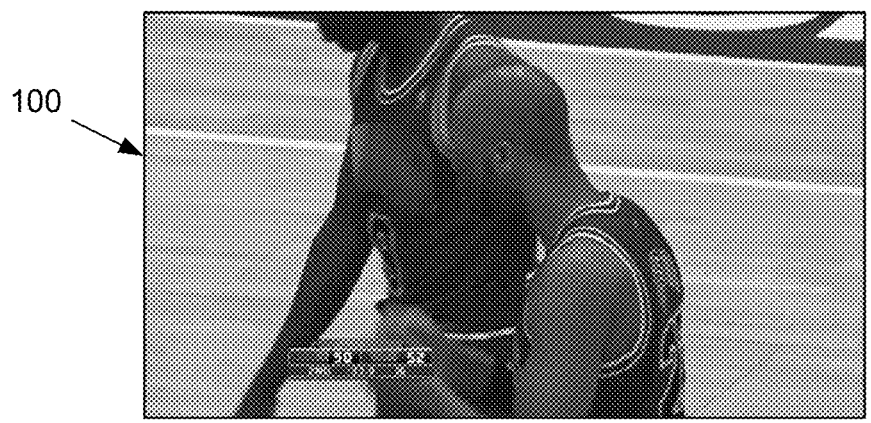
FIG. 13 depicts an exemplary frame determined to be a medium shot.
Figure 14:
FIG. 14 depicts another exemplary frame determined to be a medium shot.

FIGS. 13-14 depict exemplary embodiments of frames 100 that can be determined to be medium shots using the steps of FIG. 2. These exemplary frames 100 can each have enough pixels determined to be field pixels 402 based on initial or updated playfield detection criteria 110 to initially qualify as a medium shot, pass the standard deviation ratio test, or also have enough field pixels 402 in the detection regions 500 to have the system's final shot type classification be a medium shot.

Figure 15:
FIG. 15 depicts exemplary frame determined to not be a long or medium shot.

FIG. 15 depicts an exemplary embodiment of a frame 100 that can be determined to not be a long or medium shot using the steps of FIG. 2. Although this exemplary frame 100 can have some pixels found to be field pixels 402 based on initial or updated playfield detection criteria 110, the system can find that the frame 100 does not have a total field pixel ratio high enough to classify the frame 100 as a long or medium shot.

As discussed above, in some embodiments the playfield 102 can be a basketball court. Basketball courts have bounded areas called keys 1700 underneath each basket, in which the three seconds rule is enforced. In some basketball courts, the keys 1700 have a different color than the remainder of the court. By way of a non-limiting example, in some basketball courts the keys 1700 can be painted green while the rest of the court is a natural hardwood color or stain.

In some embodiments in which the playfield 102 is expected to be a basketball court having a differently colored key 1700 than the rest of the court, the method of FIG. 2 can move to step 1600 after determining at step 210 that the shot is a long shot to further determine and verify the color ranges of the keys 1700. In some embodiments, the determining and verification of the color ranges of the keys 1700 can be completed over a predetermined number of different frames 100 of long shots, and that depict specific camera angles such as a left camera view or right camera view. In some embodiments, after the color ranges of the keys 1700 have been determined and verified over the predetermined number of different frames 100, the color ranges of the keys 1700 can be added to the playfield detection criteria 110 in step 220, such that in subsequent frames 100 the presence of the keys 1700 can be identified within the frame 100. By way of a non-limiting example, the initial playfield detection criteria 110 can be the color ranges for the main color of the court, without color information about the color of the keys 1700. Once the presence of keys 1700 has been detected in the video and the color range of the keys 1700 has been determined and verified over the predetermined number of different frames, the initial playfield detection criteria 110 can be updated to include the color information of the keys 1700.

Figure 16:
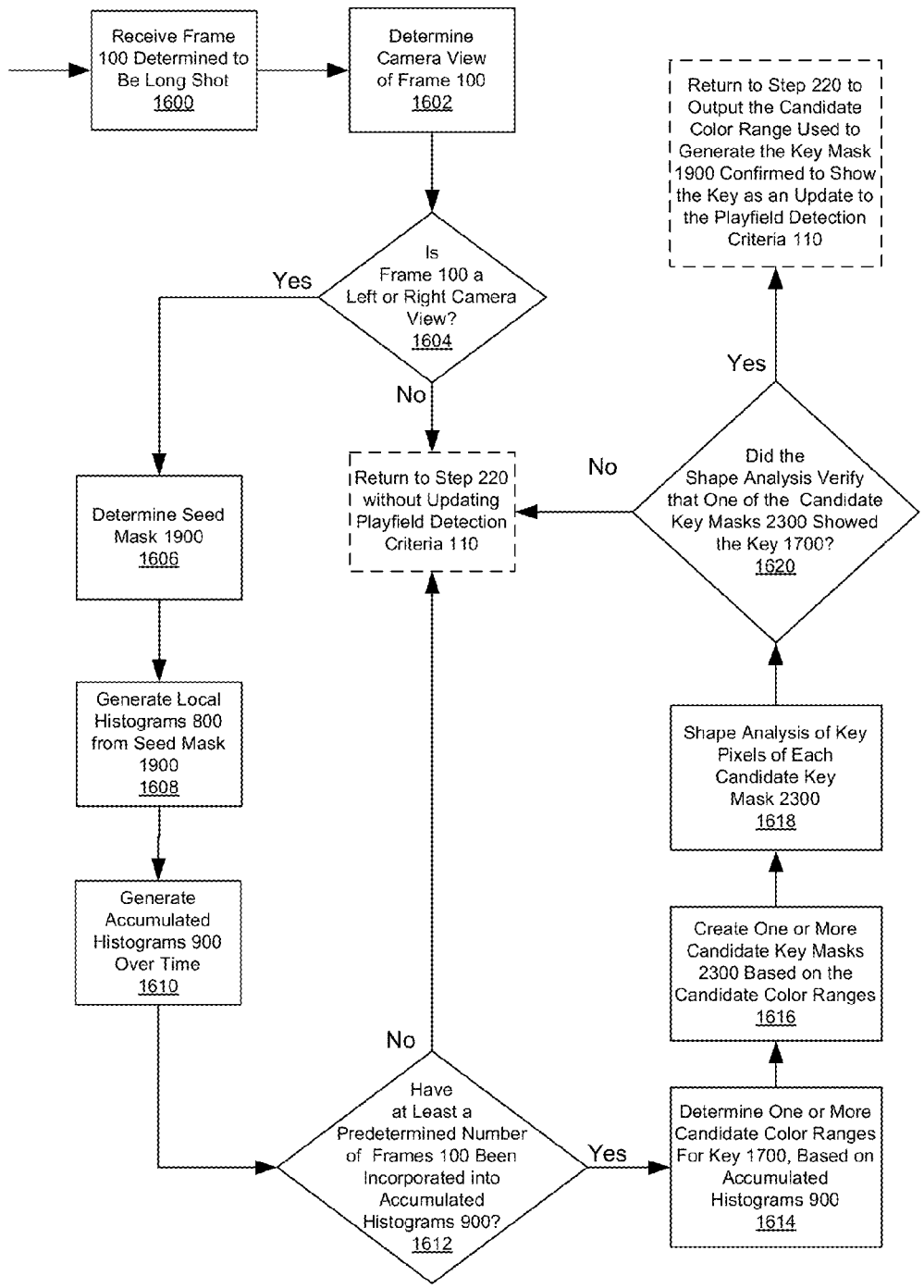
FIG. 16 depicts an exemplary method for estimating the color range of the key areas of basketball courts in long shots.
Figure 17:
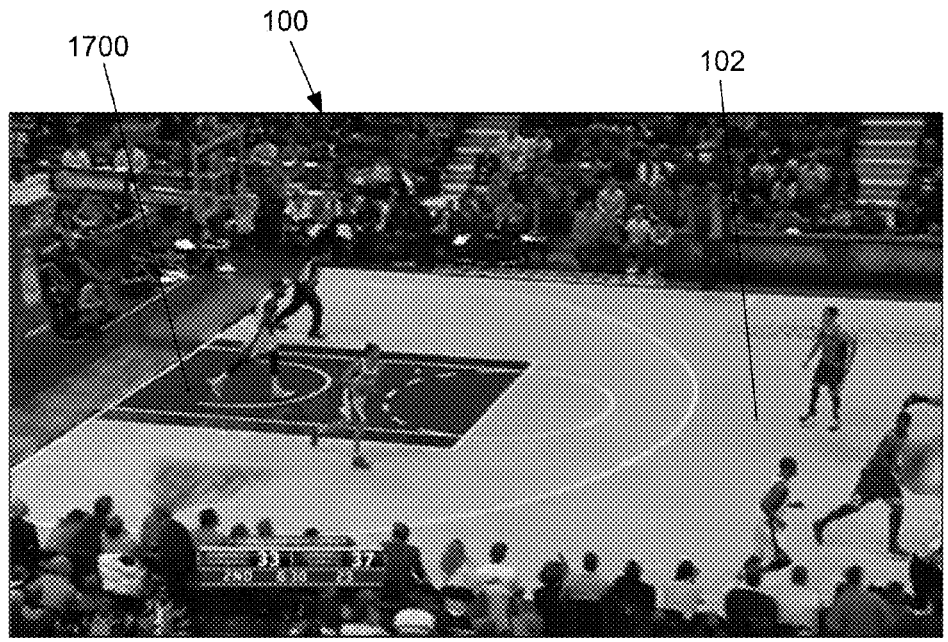
FIG. 17 depicts an exemplary frame determined to be a long shot.

FIG. 16 depicts a method for estimating the color range of the keys 1700 in long shots. In some embodiments, the method of FIG. 16 can operate in parallel with steps 216-220 of FIG. 2. If the system has determined at step 210 that the final shot type classification of a frame 100 is a long shot, the system can move to step 1600 to pass the frame 100 to a key estimation system. In some embodiments, the key estimation system can be component of the system. In other embodiments, the key estimation system can be a separate system. The key estimation system can activate step 1602 to determine whether the frame 100 depicts a left or right camera view. A right view can depict at least a portion of the key 1700 on the right side of the frame 100, while a left view can depict at least a portion of the key 1700 on the left side of the frame 100. By way of a non-limiting example, FIG. 17 depicts a long shot frame 100 with a left side view showing a key 1700. If the system determines that the frame 100 depicts a left or right view, the system can move to step 1604. If the system determines that the frame 100 does not depict a left or right view, such as a view of the center of the court that does not show a portion of the key 1700, the system can move to step 202 to load the next frame.

Figure 18:
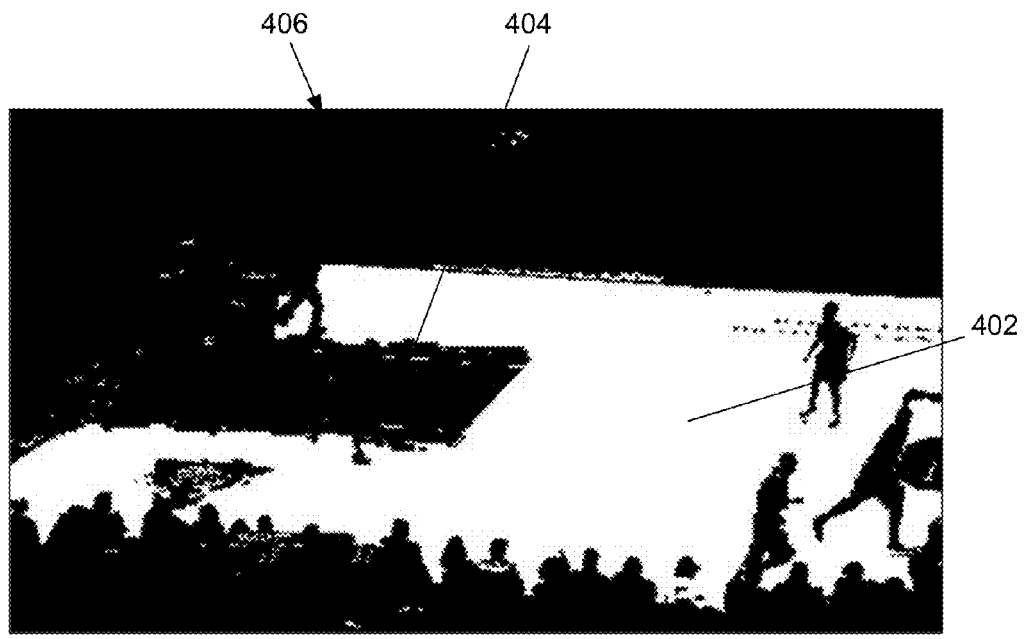
FIG. 18 depicts an exemplary binary mask of the frame of FIG. 17.

In some embodiments, the system at step 1602 can use the binary mask 406 generated during step 204 to determine the camera view based on the distribution of field pixels 402 in the total frame 100. If the color characteristics of the keys 1700 have not yet been determined, the system can find that pixels showing the keys 1700 have color components outside of the playfield detection criteria 110, and therefore classify the pixels of the keys 1700 as non-field pixels 404. By way of a non-limiting example, FIG. 18 depicts a binary mask 406 of the frame of FIG. 17, in which the pixels of the key 1700 were found to be non-field pixels 404, and the field pixels 402 were found to be the pixels with colors similar to the non-key areas of the playfield 102. The system can look at the distribution of field pixels 402 and non-field pixels 404 in the binary mask 406 to determine which areas of the frame 100 have more field pixels 402, and compare that distribution to expected models for left and right camera views. By way of a non-limiting example, in a left camera view the key 1700 can be expected to be on the left side of the frame 100 and the non-key areas of the court can be expected to make up a large portion of the right side of the frame 100. The system can thus determine that a frame 100 depicts a left camera view when the left half of the frame 100 has fewer field pixels 402 than the left half of the frame 100. In some embodiments, the distribution of field pixels 402 and non-field pixels 404 can be determined in a detection region, such as the vertically center portion of the frame 100.

At step 1604, the system can determine if the frame 100 was found to be a left camera view or a right camera view during step 1602. If the frame 100 was not found to be a left camera view or a right camera view, the system can return to step 202 to load the next frame. While in this situation the system moves from step 1604 to step 202, the system can have been concurrently and/or independently performing the steps of 214-220 before the next frame is loaded at step 202. If the frame 100 was found to be a left camera view or a right camera view, the system can move to step 1606.

Figure 19:
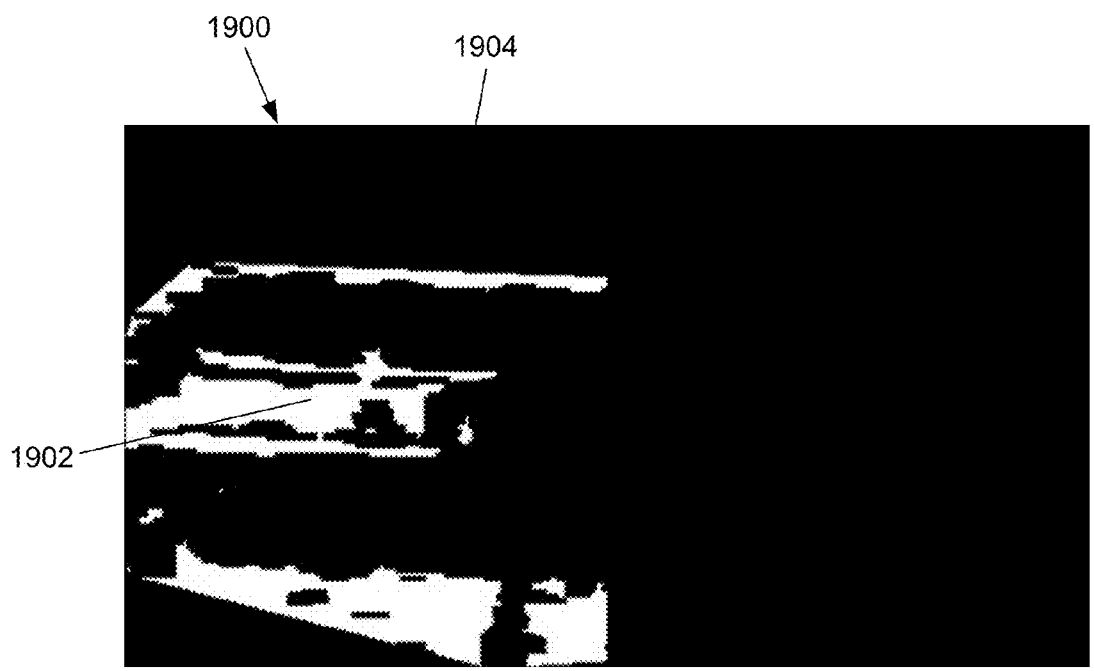
FIG. 19 depicts an exemplary seed mask of the frame of FIG. 17.

At step 1606, the system can generate a seed mask 1900 showing seed pixels 1902 and non-seed pixels 1904. In some embodiments in which the frame 100 was determined to be a long shot with a left or right camera view, the system can generate the seed mask 1900 by first determining a maximum area contour for the field pixels 402 in the binary mask 406. The system can then generate an initial seed mask, which is defined as the pixels from the convex hull of the maximum area contour. The system can then exclude the field pixels 402 from the initial seed mask to obtain the final seed mask 1900. In some embodiments, the final seed mask 1900 can be generated by the binary XOR operation between the initial seed pixels and the field pixels 402 in the binary mask 406. The seed pixels 1902 of the seed mask 1900 can represent pixels forming portions of the key 1700, as well as other background pixels, such as text, fans, logos, or other elements. By way of a non-limiting example, FIG. 19 depicts the seed mask 1900 of the frame 100 shown in FIG. 17, with the seed pixels 1902 shown in white and the non-seed pixels 1904 shown in black. In some embodiments, the seed mask 1900 can be generated from the half of the frame 100 that shows the key 1700, which can be determined by the camera view. By way of a non-limiting example, the seed mask 1900 shown in FIG. 19 was generated from the left half of the frame 100 of FIG. 17 because the frame 100 of FIG. 17 was determined to be a left camera view.

Figure 20:
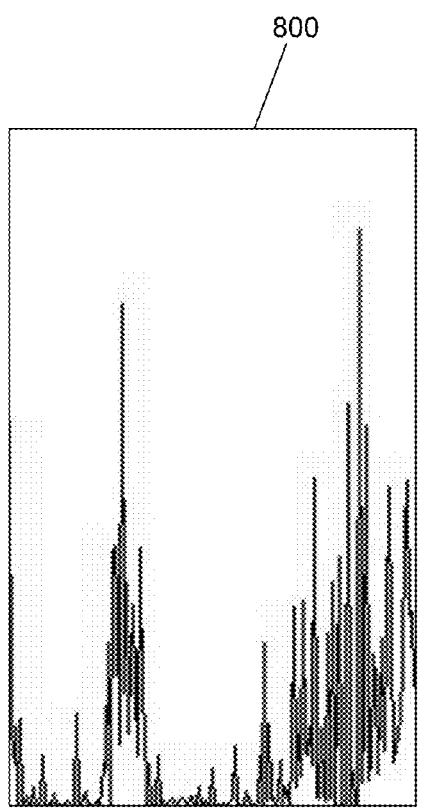
FIG. 20 depicts a exemplary local hue histogram of the seed pixels of FIG. 19.

At step 1608, the system can generate one or more local histograms 800 of the color components of the pixels in the seed mask 1900. As with the local histograms 800 of the field pixels 402 discussed above with respect to step 216, the local histograms 800 of the seed mask 1900 can be one or more histograms 800 of the colors of one or more selected regions 802 of the frame. In some embodiments, the selected regions 802 of the frame used in step 1608 can be the portions of the frame 100 defined by the seed pixels 1902 shown in the seed mask 1900. By way of a non-limiting example, FIG. 20 depicts a local histogram 800 of the hue components of the field pixels 1902.

Figure 21:
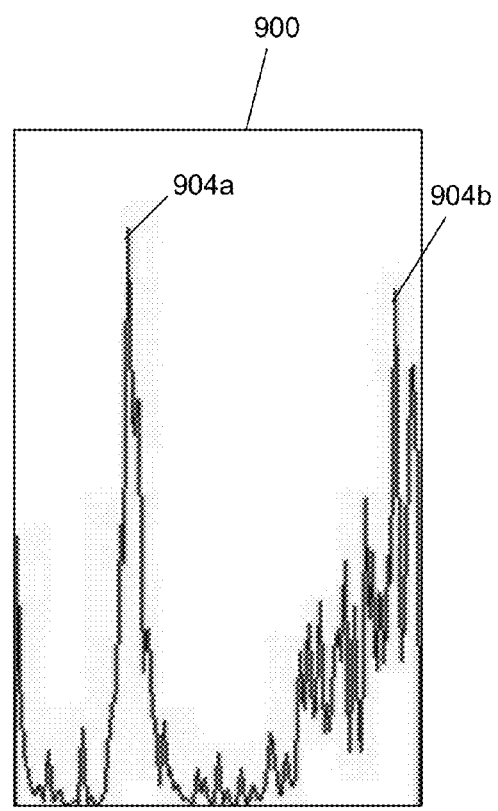
FIG. 21 depicts an exemplary accumulated hue histogram.

At step 1610, the local histograms 800 of the seed masks 1900 generated during step 1608 for a single frame 100 can be integrated into accumulated histograms 900 for either the left or right camera views. The system can maintain accumulated histograms 900 for long shots with either right or left camera views. By way of a non-limiting example, FIG. 21 depicts an accumulated histogram 900 of the hue values of a plurality of seed masks 1900 over multiple frames 100 of either a left or right camera view, including the local histogram 800 shown in FIG. 20. In some embodiments, the system can use a temporal recursive filter to integrate the data in the local histogram 800 of the key mask 1900 of the latest frame 100 into the accumulated histogram 900 for the camera view. For key color estimation, the accumulated histogram 900 can be accumulated over a predetermined number of frames for the accumulated histogram's camera view.

At step 1612, the system can determine whether the accumulated histograms 900 have incorporated data from the predetermined number of frames 100. In some embodiments, the system can check whether the accumulated histograms 900 have been generated from at least a predetermined number of local histograms 800. By way of a non-limiting example, the predetermined number can be 180, such that the system can determine whether the local histograms 800 of at least 180 frames 100 have been accumulated into the accumulated histograms 900 for either left or right camera view.

If the accumulated histograms 900 have not yet incorporated data from the predetermined number of frames 100, the key color estimation system can wait for more frames 100, and return to step 202 to load the next frame. While in this situation the system moves from step 1612 to step 202, the system can have been concurrently and/or independently performing the steps of 214-220 before the next frame is loaded at step 202. If the accumulated histograms 900 have incorporated data from the predetermined number of frames 100, the system can move to step 1614.

Figure 22:
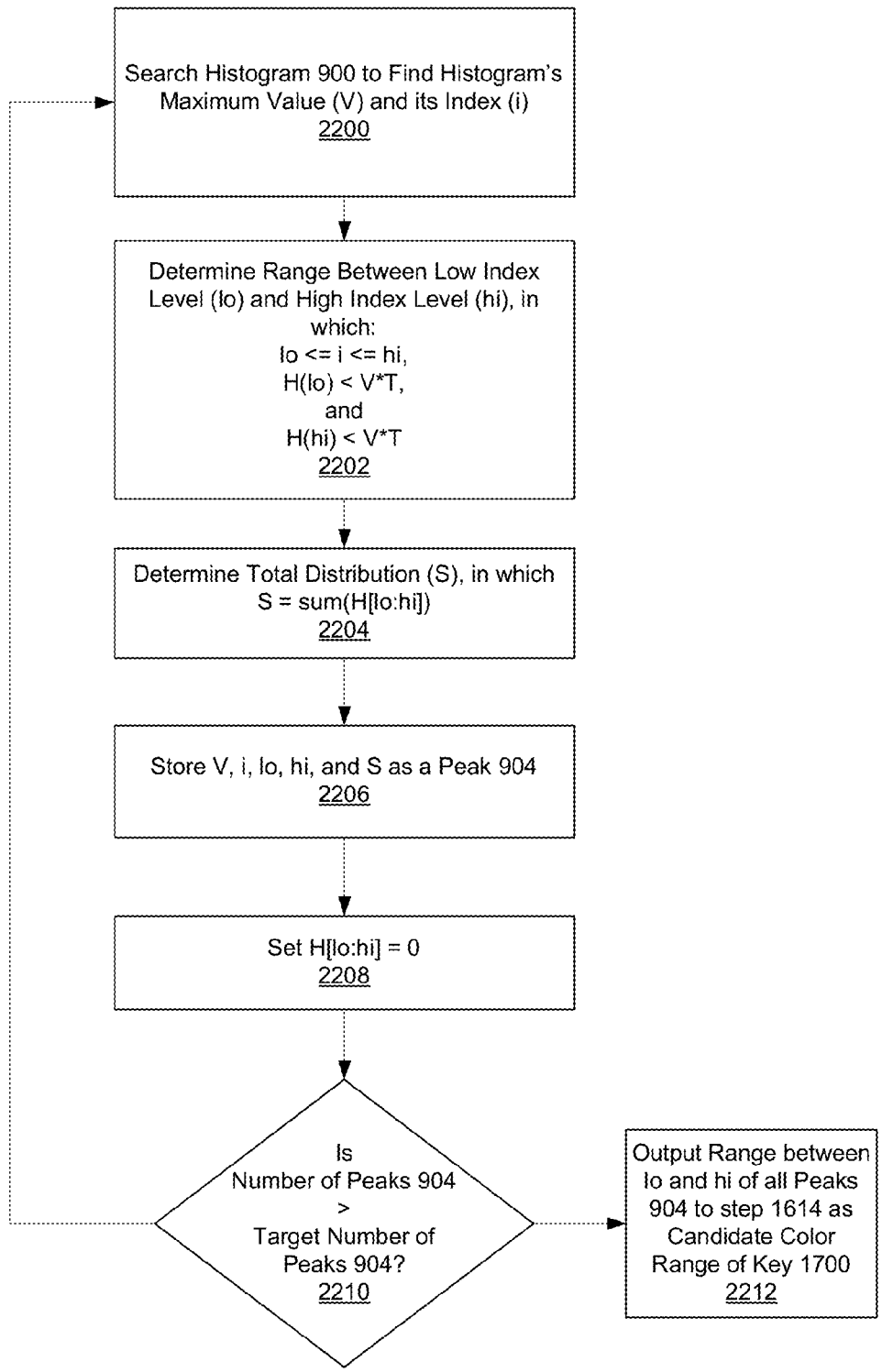
FIG. 22 depicts an exemplary method of determining the color range of the key areas based on an accumulated hue histogram.

At step 1614, the system can determine candidate color ranges for the keys 1700 from the accumulated histograms 900. The histograms 900 can have one or more peaks 904 that can be used to determine the candidate color ranges. In some embodiments, the system can perform low-pass filtering on the values of accumulated histogram 900 prior to finding peaks 904. By way of a non-limiting example, in equation form, $Hnew(i)=0.25H(i-1)+0.5H(i)+0.25H(i+1)$, where H is the accumulated histogram 900 and Hnew is the filtered accumulated histogram 900. In some embodiments, the system can determine the color ranges for the keys 1700 using the method of FIG. 22. The color ranges can be defined in a color format, such as HSV ranges.

At step 2200, the system can search an accumulated histogram 900 to find a peak 904. The maximum histogram value (V) of the histogram 900 and its index level (i) can be saved into memory.

At step 2202, the system can determine a range between a low index level (lo) and a high index level (hi), such that the index level (i) of the histogram's maximum value (V) is between the low index level (lo) and the high index level (hi). In equation form, the range can be: $lo<=i<=hi$.

The low index level (lo) and the high index level (hi) can be determined such that the histogram's value at the low index level (lo) is less than the histogram's maximum value (V) multiplied by an amplitude threshold (T), and also that the histogram's value at the high index level (hi) is less than the histogram's maximum value (V) multiplied by the amplitude threshold (T). In equation form, the low index level (lo) and the high index level (hi) can be determined such that: $H(lo)<V*T$ and $H(lo+1)>=V*T$, and $H(hi)<V*T$ and $H(hi-1)>=V*T$. The amplitude threshold (T) can be set at any desired value. By way of a non-limiting example, T can be set to 0.1, such that the values of the histogram at the low index level (lo) and the high index level (hi) are 10% of the histogram's maximum value (V).

At step 2204, the system can determine the total distribution (S) of the range, by summing the values of the histogram 800 between the low index level (lo) and the high index level (hi). In equation form, the total distribution can be determined such that: S=sum(H[lo:hi]).

At step 2206, the index (i), maximum value (V), low index level (lo), high index level (hi), and total distribution (S) determined between steps 2200 and 2204 can be stored to memory as characteristics of a peak 904. The range of values in the peak 904 can be significant color distribution, in which a significant number of pixels of similar color were found in the accumulated histogram 900.

At step 2208, the values of the histogram 900 between the low index level (10) and high index level (hi) can be set to zero, such that the values in the current peak 904 are not considered again in searches for additional peaks 904. The original accumulated histogram 900 can be saved with its values unaltered for future use.

At 2210, the system can determine whether the number of peaks 904 found in the histogram 900 is larger than a predetermined target number of peaks. If the number of peaks 904 is larger than the predetermined target number of peaks, the system can exit at step 2212, and use the color ranges determined between the low index level (lo) and high index level (hi) for each peak 904 as the candidate color ranges of the key 1700. If the number of peaks 904 is less than or equal to the predetermined target number of peaks 904, the system can return to step 2200 to search for another peak 900. The system can use the range between the low index level (lo) and high index level (hi) of each peak 904 to create a candidate range, and the candidate ranges can be used at step 1614 as the candidate color ranges of the key 1700.

Figure 23A:
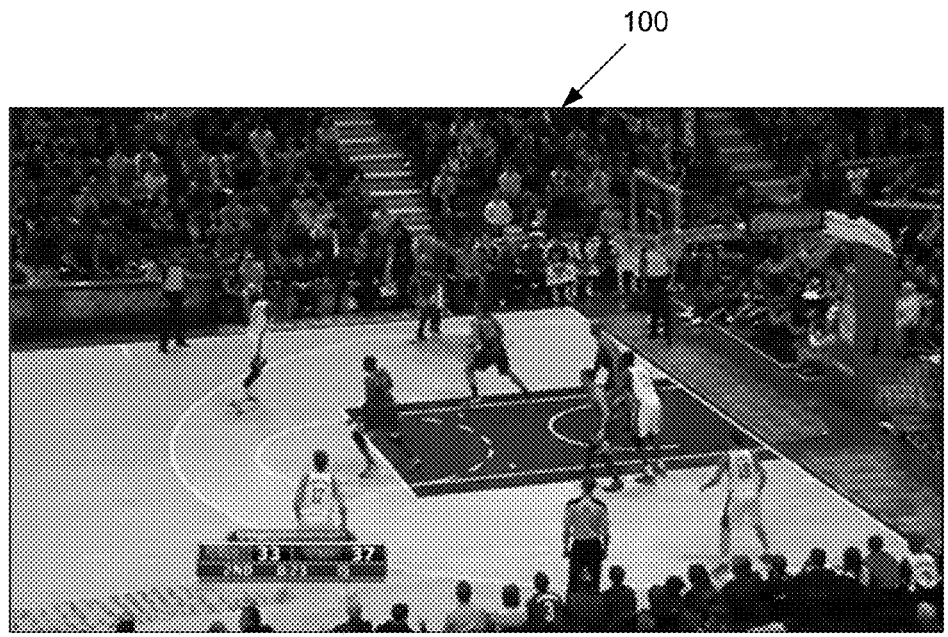
FIG. 23A depicts an exemplary long shot right camera view frame.
Figure 23B:
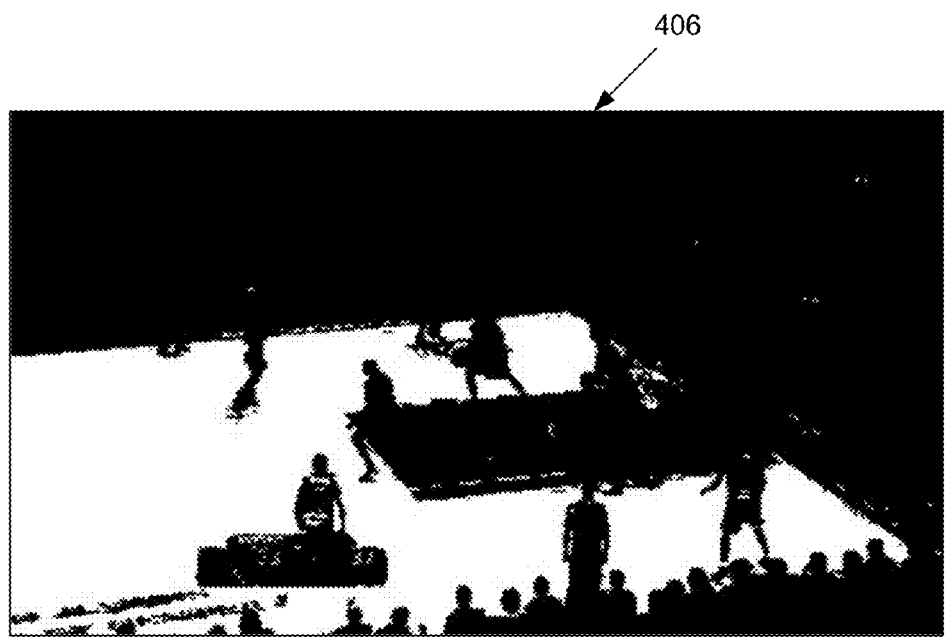
FIG. 23B depicts an exemplary binary mask of the frame shown in FIG. 23A.
Figure 23C:
FIG. 23C depicts a first exemplary candidate key mask generated from the frame shown in FIG. 23A.
Figure 23D:
FIG. 23D depicts a second exemplary candidate key mask generated from the frame shown in FIG. 23A.
Figure 23E:
FIG. 23E depicts a third exemplary candidate key mask generated from the frame shown in FIG. 23A.

At step 1616, the system can use each of the candidate color ranges of the key 1700 determined during step 1614 to generate a candidate binary key mask 2300 comprising key pixels 2302 and non-key pixels 2304, with the key pixels 2102 of each candidate binary key mask 2300 being those pixels that have color components matching one candidate color range of the key 1700 and the non-key pixels 2104 being those pixels that do not have color components matching the candidate color range of the key 1700. By way of a non-limiting example, FIG. 23A depicts a right camera view long shot frame 100, FIG. 23B depicts a binary mask 406 of the frame 100 shown in FIG. 23A, and FIGS. 23C-23E respectively depict three candidate binary key masks 2300 each generated from the frame 100 shown in FIG. 23A using different candidate color ranges for the key 1700. FIG. 23C was generated using a range of hue values between 122 and 152; FIG. 23D was generated using a range of hue values between 43 and 62; and FIG. 23E was generated using a range of hue values between 153 and 179.

At step 1618, the system can perform a shape analysis of each candidate key mask 2300. If the key pixels 2302 of a candidate key mask 2300 fit into an expected pattern, the candidate color range from which the candidate key mask 2300 was generated can be confirmed to be the final color range for the key 1700. Each candidate key mask can be subject to shape analysis during step 1618.

Figure 24:
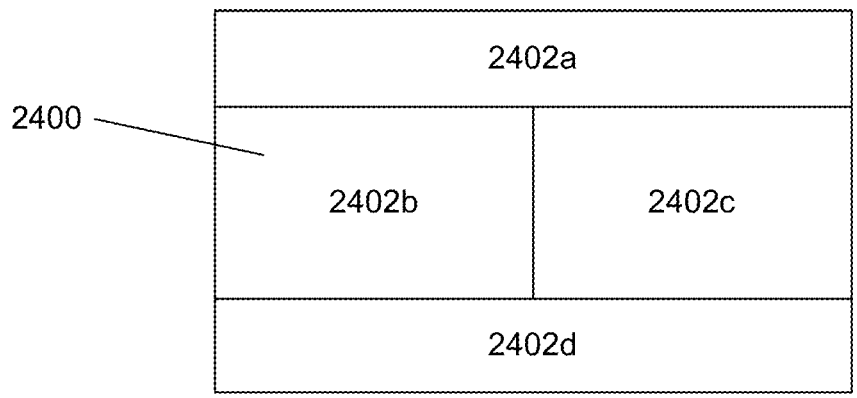
FIG. 24 depicts a first exemplary selected region for key shape analysis.
Figure 25:
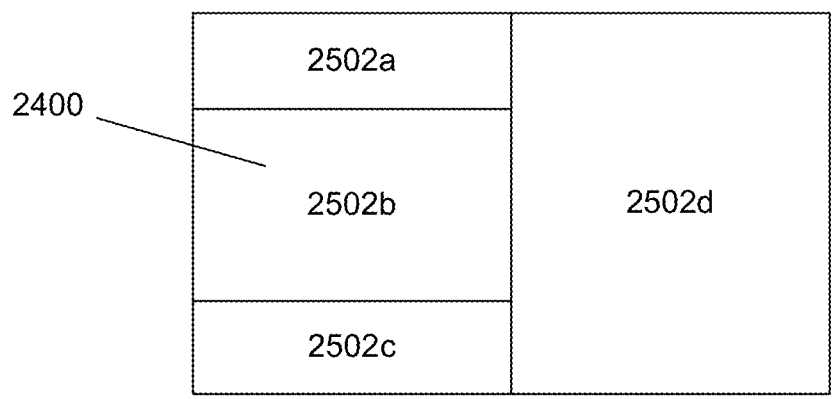
FIG. 25 depicts a second exemplary selected region for key shape analysis.

In some embodiments, in order to identify and verify if a candidate key pixel 2302 does represent a key 1700, the system can test if the key pixels 2302 fall into a selected region 2400 of the frame 100 by checking one or more regional pixel ratios. By way of a non-limiting example, FIG. 24 depicts the frame 100 divided into four regions 2402: an upper portion 2402a, a center left portion 2402b, a center right portion 2402c, and a lower portion 2402d, in which the center left portion 2402b can be the selected region 2400 on which regional pixel ratio analysis can be performed. By way of another non-limiting example, FIG. 25 depicts the frame 100 divided into four regions 2502: an upper left portion 2502a, a center left portion 2502b, a lower left portion 2502c, and a right portion 2502d, in which the center left portion 2502b can be the selected region 2400 on which regional pixel ratio analysis can be performed.

In some embodiments, a horizontal regional pixel ratio (Rh) can be determined by dividing the number of key pixels 2302 in the region 2402b by the number of key pixels 2302 in both regions 2402b and 2402c for a left camera view long shot frame. Similarly, a vertical regional pixel ratio (Rv) can be determined by dividing the number of key pixels 2302 in the region 2502b by the number of key pixels 2302 in the regions 2502a, 2502b, and 2502c for a left camera view long shot frame. For right camera view long shot frames, the horizontal regional pixel ratio (Rh) and the vertical regional pixel ratio (Rv) can be similarly defined, with the testing pixels being taken from the right half of the frame 100 instead of the left half as can be done for left camera view long shot frames. The system can accumulate Rh*Rv for each candidate color range based on the candidate key masks 2300.

After a predetermined number of candidate key masks 2300 have been processed during step 1618, the candidate color ranges can be sorted based on their accumulated Rh*Rv. If the accumulated Rh*Rv is larger than a predetermined threshold, the candidate color range with the largest accumulated Rh*Rv, can be identified and verified to be the color range that can detect the key area 1700. By way of a non-limiting example, the candidate key mask 2300b shown in FIG. 23D can be verified as depicting the key 1700 because its key pixels 2302 pass the shape analysis of step 1618, and the color range between the hue values of 43 and 62 used to generate the candidate key mask 2300b can be determined to be the verified color range for the key 1700.

Figure 26:
FIG. 26 depicts an exemplary key mask of a right camera view long shot.
Figure 27:
FIG. 27 depicts an exemplary binary mask of the same right camera view long shot as FIG. 26.
Figure 28:
FIG. 28 depicts an exemplary combined mask combining the key mask of FIG. 26 and the binary mask of FIG. 27.

At step 1620, if the shape analysis and key color range verification of step 1618 determined that one of the candidate key masks 2300 showed the key 1700, the confirmed color range of the key 1700 can be output to step 220 to add and/or update the determined color ranges of the keys 1700 as playfield detection criteria 110. If the shape analysis and key color range verification of step 1618 did not find that one of the candidate color ranges was a color range for the key 1700, for example if no candidate color range had an accumulated Rh*Rv larger than the predetermined threshold, the system can return to step 220 without updating the playfield detection criteria 110, and/or can restart the key color estimation and verification at a later time or stop further trial of key color estimation. In some embodiments, a key mask 2300 generated with the color ranges for the key 1700 can be combined with a binary mask 406 to obtain a combined mask 2800 representing the entire playfield 102. By way of a non-limiting example, FIG. 26 depicts a binary key mask 2300 comprising key pixels 2302 generated from the color ranges of the key 1700 confirmed during steps 1618 and 1620, and FIG. 27 depicts a binary mask 406 comprising field pixels 402 generated during step 204. FIG. 28 depicts an exemplary combined mask 2800 with its mask pixels being the key pixels 2302 and the field pixels 402, thereby representing the entire playfield 102.

Figure 29:
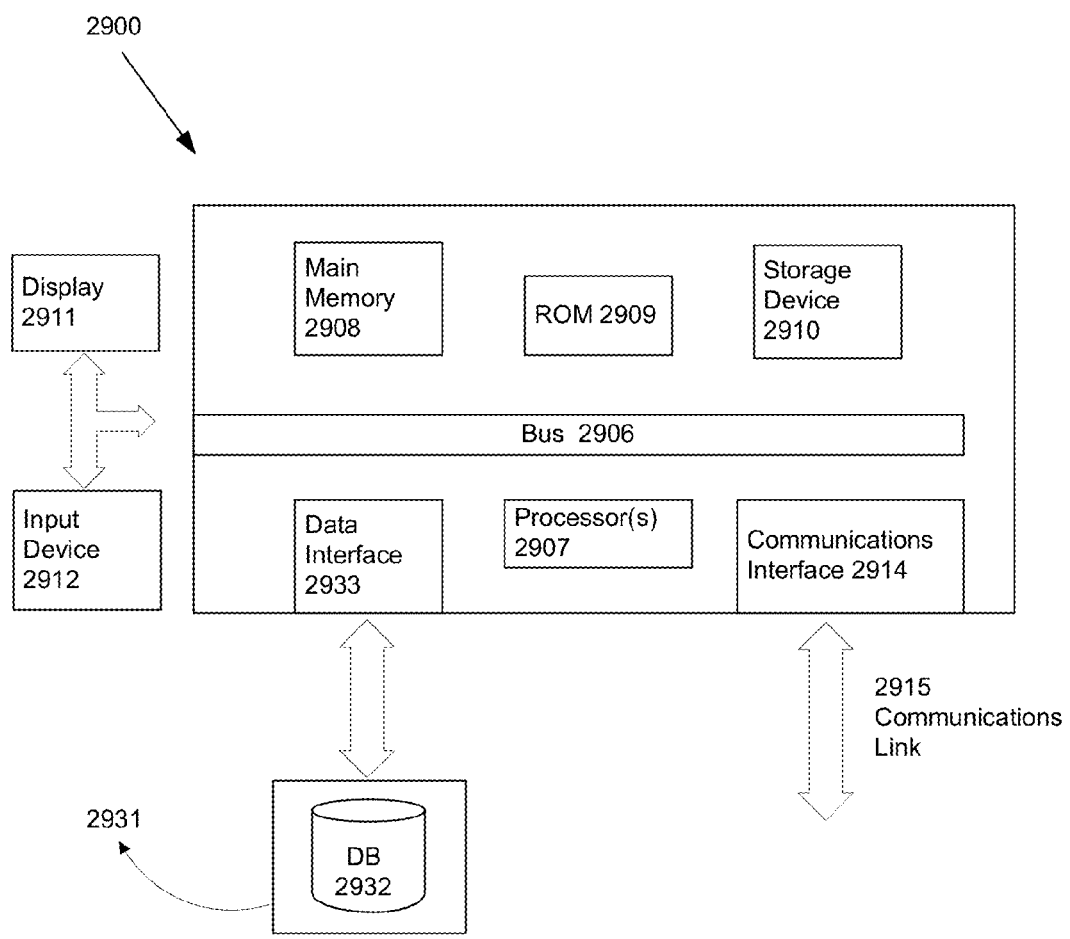
FIG. 29 depicts an exemplary embodiment of computer hardware that can perform the disclosed embodiments and methods.

The execution of the sequences of instructions required to practice the embodiments may be performed by a computer system 2900 as shown in FIG. 29. In an embodiment, execution of the sequences of instructions is performed by a single computer system 2900. According to other embodiments, two or more computer systems 2900 coupled by a communication link 2915 may perform the sequence of instructions in coordination with one another. Although a description of only one computer system 2900 may be presented herein, it should be understood that any number of computer systems 2900 may be employed.

A computer system 2900 according to an embodiment will now be described with reference to FIG. 29, which is a block diagram of the functional components of a computer system 2900. As used herein, the term computer system 2900 is broadly used to describe any computing device that can store and independently run one or more programs.

The computer system 2900 may include a communication interface 2914 coupled to the bus 2906. The communication interface 2914 provides two-way communication between computer systems 2900. The communication interface 2914 of a respective computer system 2900 transmits and receives electrical, electromagnetic or optical signals, that include data streams representing various types of signal information, e.g., instructions, messages and data. A communication link 2915 links one computer system 2900 with another computer system 2900. For example, the communication link 2915 may be a LAN, an integrated services digital network (ISDN) card, a modem, or the Internet.

A computer system 2900 may transmit and receive messages, data, and instructions, including programs, i.e., application, code, through its respective communication link 2915 and communication interface 2914. Received program code may be executed by the respective processor(s) 2907 as it is received, and/or stored in the storage device 2910, or other associated non-volatile media, for later execution.

In an embodiment, the computer system 2900 operates in conjunction with a data storage system 2931, e.g., a data storage system 2931 that contains a database 2932 that is readily accessible by the computer system 2900. The computer system 2900 communicates with the data storage system 2931 through a data interface 2933.

Computer system 2900 can include a bus 2906 or other communication mechanism for communicating the instructions, messages and data, collectively, information, and one or more processors 2907 coupled with the bus 2906 for processing information. Computer system 2900 also includes a main memory 2908, such as a random access memory (RAM) or other dynamic storage device, coupled to the bus 2906 for storing dynamic data and instructions to be executed by the processor(s) 2907. The computer system 2900 may further include a read only memory (ROM) 2909 or other static storage device coupled to the bus 2906 for storing static data and instructions for the processor(s) 2907. A storage device 2910, such as a magnetic disk or optical disk, may also be provided and coupled to the bus 2906 for storing data and instructions for the processor(s) 2907.

A computer system 2900 may be coupled via the bus 2906 to a display device 2911, such as an LCD screen. An input device 2912, e.g., alphanumeric and other keys, is coupled to the bus 2906 for communicating information and command selections to the processor(s) 2907.

According to one embodiment, an individual computer system 2900 performs specific operations by their respective processor(s) 2907 executing one or more sequences of one or more instructions contained in the main memory 2908. Such instructions may be read into the main memory 2908 from another computer-usable medium, such as the ROM 2909 or the storage device 2910. Execution of the sequences of instructions contained in the main memory 2908 causes the processor(s) 2907 to perform the processes described herein. In alternative embodiments, hard-wired circuitry may be used in place of or in combination with software instructions. Thus, embodiments are not limited to any specific combination of hardware circuitry and/or software.

Although the present invention has been described above with particularity, this was merely to teach one of ordinary skill in the art how to make and use the invention. Many additional modifications will fall within the scope of the invention, as that scope is defined by the following claims.

What is claimed:

1. A method of classifying the shot type of a video frame, comprising:
    loading a frame comprising a plurality of pixels into memory;
    dividing said frame into field pixels and non-field pixels based on a first playfield detection criteria, wherein said dividing of said frame into said field pixels and said non-field pixels generates a binary mask;
    determining an initial shot type classification using the number of said field pixels and the number of said non-field pixels;
    partitioning said frame into one or more regions based on said initial classification;
    determining the status of each of said one or more regions based upon the number of said field pixels and said non-field pixels located within each said region;
    determining a shot type classification for said frame based upon said status of each said region;
    determining a camera view angle from said binary mask;
    generating a seed mask;
    generating a local histogram of the mask pixels of said seed mask;
    accumulating at least a predetermined number of said local histograms into an accumulated histogram for each camera view; and
    identifying one or more color ranges for the key area of a basketball court from said accumulated histogram for one or more particular camera views.

2. The method of claim 1, further comprising:
    updating said first playfield detection criteria when said shot type classification for said frame is a long shot or a medium shot by generating one or more local histograms of the color components of said frame within a selected region of said frame;
    generating one or more accumulated histograms for a final shot type classification by integrating data in said local histograms of the current frame and previous frames of said final shot type classification; and
    updating said first playfield detection criteria for subsequent frames by narrowing said first playfield detection criteria to fit peaks on said accumulated histograms for the final shot type classification.

3. The method of claim 2, wherein said color components are a hue component, a saturation component, and a value component.

4. The method of claim 2, wherein said selection region is the bottom three quarters of said frame when said frame is divided vertically into two sections.

5. The method of claim 2, wherein the step of updating the first playfield detection criteria further comprises:
    calculating a value component threshold for the accumulated histogram for a final shot type classification;
    dividing the value component of the accumulated histogram for a final shot type classification into a first region comprising value components less than the value component threshold and a second region comprising value components greater than the value component threshold; and
    setting the value component of the first playfield detection criteria to include the value component values within the second region.

6. The method of claim 5, wherein said value component threshold is the value component obtained by applying Otsu's method on the value components of the accumulated histogram for a final shot type classification to obtain a upper Otsu region and applying Otsu's method on the upper Otsu region to obtain the value component threshold.

7. The method of claim 5, wherein said value component threshold is the value component obtained by:
   finding a first threshold such that the distribution of value components in the accumulated histogram for a final shot type classification between 0 and the first threshold is not less than a first distribution threshold;
   finding a second threshold such that the distribution of value components in the accumulated histogram for a final shot type classification between 0 and the second threshold is not less than a second distribution threshold; and
   finding the minimum value component threshold value between the first distribution threshold and the second distribution threshold.

8. The method of claim 1, wherein said first playfield detection criteria are one or more color ranges, wherein each said color range consists of a range of hue component values, a range of saturation component values, and a range of value component values.

9. The method of claim 1, further comprising:
   applying a second playfield detection criteria to a selected region of said frame to obtain field pixels for the selected region of said frame, wherein the color range of the second playfield detection criteria is different than the color range of the first playfield detection criteria;
   incorporating the field pixels for the selected region of said frame into the field pixels obtained from the first playfield detection criteria.

10. The method of claim 1, wherein one of said at least one regions is the bottom three quarters of said frame when said frame is divided vertically into two sections.

11. The method of claim 1, wherein one of said at least one regions is the center half of said frame when said frame is divided horizontally into three sections.

12. The method of claim 1, wherein said binary mask is generated from a logical combination of multiple masks each generated by a division of said frame into said field pixels and said non-field pixels according to different sets of color ranges in said first playfield detection criteria.

13. The method of claim 1, wherein the step of determining a shot type classification for said frame further comprises:
   calculating a standard deviation of the hue of the field pixels and the standard deviation of the hue of the non-field pixels;
   comparing a standard deviation ratio by dividing the standard deviation of the non-field pixels by the standard deviation of the field pixels; and
   comparing the standard deviation ratio to a predetermined standard deviation ratio threshold.

* * * * *